(12) United States Patent
Nakamura et al.

(10) Patent No.: US 12,200,393 B2
(45) Date of Patent: Jan. 14, 2025

(54) IMAGE PROCESSING DEVICE, IMAGE PROCESSING METHOD, AND STORAGE MEDIUM

(71) Applicant: CANON KABUSHIKI KAISHA, Tokyo (JP)

(72) Inventors: Koki Nakamura, Tokyo (JP); Tokuro Nishida, Kanagawa (JP); Hiroyuki Hasegawa, Chiba (JP); Kengo Takeuchi, Kanagawa (JP); Kazuya Kitamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/068,630

(22) Filed: Dec. 20, 2022

(65) Prior Publication Data
US 2023/0216983 A1 Jul. 6, 2023

(30) Foreign Application Priority Data

Jan. 4, 2022 (JP) .................................. 2022-000224
Jan. 4, 2022 (JP) .................................. 2022-000249
(Continued)

(51) Int. Cl.
H04N 5/268 (2006.01)
G06T 7/50 (2017.01)
(Continued)

(52) U.S. Cl.
CPC ............... *H04N 5/268* (2013.01); *G06T 7/50* (2017.01); *H04N 5/265* (2013.01); *H04N 23/61* (2023.01); *H04N 25/704* (2023.01)

(58) Field of Classification Search
CPC ........ H04N 5/268; H04N 5/265; H04N 23/61; H04N 25/704; H04N 25/134;
(Continued)

(56) References Cited

U.S. PATENT DOCUMENTS 10,139,218 B2 11/2018 Matsushita
2010/0020867 A1* 1/2010 Wiegand ................ H04N 19/34
375/E7.2
(Continued)

FOREIGN PATENT DOCUMENTS

JP 2014149484 A 8/2014
JP 2014154980 A 8/2014
(Continued)

OTHER PUBLICATIONS

The above patent documents were cited in the Jun. 11, 2024 Japanese Office Action, which is enclosed without an English Translation, that issued in Japanese Patent Application No. 2022-183629.
(Continued)

*Primary Examiner* — Hung H Lam
(74) *Attorney, Agent, or Firm* — Cowan, Liebowitz & Latman, P.C.

(57) ABSTRACT

An image processing device that can facilitate setting related to layer information based on distance information is provided.

The image processing device includes an image acquisition unit configured to acquire an image including a subject through a lens unit, a distance information acquisition unit configured to acquire distance information indicating a distance to the subject, a layer information generation unit configured to generate layer information on a layer for each distance based on the distance information, and a setting unit configured to set a reference for generating the layer information and switch display of a setting value capable of being set in accordance with the lens information of the lens unit.

20 Claims, 26 Drawing Sheets

(30) Foreign Application Priority Data

Jan. 4, 2022 (JP) ................................ 2022-000259
Nov. 16, 2022 (JP) ................................ 2022-183629

(51) Int. Cl.
*H04N 5/265* (2006.01)
*H04N 23/61* (2023.01)
*H04N 25/704* (2023.01)

(58) Field of Classification Search
CPC .... H04N 5/2621; H04N 5/272; H04N 23/635; H04N 23/672; H04N 23/675; H04N 5/2226; G06T 7/50; G06T 2207/10024; G06T 2207/30196; G06T 7/11; G06T 7/194; G06T 1/0007; G06T 1/20; G06T 2200/28
See application file for complete search history.

(56) References Cited

U.S. PATENT DOCUMENTS

| | | | | |
|---|---|---|---|---|
| 2015/0163394 | A1* | 6/2015 | Tsai | H04N 23/959 348/222.1 |
| 2015/0358529 | A1* | 12/2015 | Kawakami | H04N 23/959 348/349 |
| 2016/0227121 | A1* | 8/2016 | Matsushita | G01B 11/22 |
| 2019/0058827 | A1 | 2/2019 | Park et al. | |
| 2021/0327081 | A1* | 10/2021 | Takizawa | G06T 11/001 |
| 2022/0417420 | A1* | 12/2022 | Ko | H04N 23/611 |

FOREIGN PATENT DOCUMENTS

| | | |
|---|---|---|
| JP | 2015001609 A | 1/2015 |
| JP | 2016-143919 A | 8/2016 |
| JP | 2018-029270 A | 2/2018 |
| JP | 2021-048560 A | 3/2021 |
| WO | 2011118066 A | 9/2011 |
| WO | 2016152633 A | 9/2016 |
| WO | 2016152634 A | 9/2016 |

OTHER PUBLICATIONS

The above patent documents were cited in a European Search Report issued on Sep. 8, 2023, which s enclosed, that issued in the corresponding European Patent Application No. 22211880.4.

* cited by examiner

FIG. 2A

| R | Gr | R | Gr | R | Gr | R | Gr | R | Gr |
|---|----|---|----|---|----|---|----|---|----|
| Gb | B | Gb | B | Gb | B | Gb | B | Gb | B |

FIG. 2B

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

FIG. 15

| Type | Data | Content |
|---|---|---|
| Lens information 1 | Aperture value (F value) | Aperture value of lens |
| Lens information 2 | Focal length | Focal length of lens |
| Lens information 3 | Focus lens image surface position | Difference between current focus lens position and reference position of image surface focus position |
| Lens information 4 | Focus lens subject distance | Subject distance being in focus at current position of focus lens |
| Lens information 5 | Focus lens both ends image surface position | Image surface defocus information from current focus position to infinite end<br>Image surface defocus information from current focus position to close end |

FIG. 16A

| F value | Image surface resolution [mm] |
|---|---|
| 1.0 | 0.002 |
| 1.4 | 0.006 |
| 1.8 | 0.008 |
| 2.0 | 0.009 |
| 2.4 | 0.011 |
| 2.8 | 0.013 |
| 3.5 | 0.016 |
| 4 | 0.019 |
| 4.5 | 0.022 |
| 5.6 | 0.025 |
| 6.3 | 0.040 |
| 8 | 0.060 |
| 11 | 0.11 |
| 13.3 | 0.17 |
| 16 | 0.22 |
| 22 | 0.45 |

FIG. 16B

| ISO | Noise affecting image surface resolution [mm] |
|---|---|
| 100 | 0 |
| 200 | 0.001 |
| 400 | 0.002 |
| 800 | 0.003 |
| 1600 | 0.005 |
| 3200 | 0.015 |
| 6400 | 0.035 |

IMAGE PROCESSING DEVICE, IMAGE PROCESSING METHOD, AND STORAGE MEDIUM

BACKGROUND OF THE INVENTION

Field of the Invention

The present invention relates to an image processing device, an image processing method, a storage medium, and the like.

Description of the Related Art

At present, there is a method called chroma key synthesis, which is video synthesis technology commonly used in movies and television, in which a specific color part of a video is made transparent and synthesized with a different video. When a video for chromakey synthesis is captured, it is necessary to prepare a background of a specific color, such as a green background or a blue background, and it is also necessary to perform an operation of smoothing out wrinkles so that there is no color unevenness in the background, and to adjust illumination.

In addition, when reflected light from a green background is reflected on a subject, the background cannot be separated well, and thus it may be necessary to remove the reflection of reflected light in post-processing after imaging.

On the other hand, as video synthesis technology that has been used in recent years, there is a method of separating a subject and a background from each other by using information on a distance to the subject and synthesizing the subject with another video. When this method is used, it is not necessary to prepare a background such as a green background, and complicated work for chromakey synthesis mentioned above is no longer necessary.

In addition, there is also video synthesis technology for inserting computer graphics (hereafter referred to as CG) into a space between a subject and a background or a space between the subject and a camera by using information on a distance to the subject.

As a method of acquiring information on a distance to a subject, for example, there is a method of measuring a distance to the subject by using a device equipped with a distance sensor, separate from a video processing device for video capturing. In this case, since an angle of view and a resolution differ depending on devices, it is necessary to perform calibration work before imaging in order to perform image synthesis in post-processing.

On the other hand, as another method of acquiring information on a distance to a subject, for example, technology disclosed in Japanese Patent Application Laid-Open No. 2021-48560 is known. Japanese Patent Application Laid-Open No. 2021-48560 discloses technology for generating distance information indicating a distance from a video processing device to a subject by using an imaging element having a distance measurement function of an imaging surface phase difference system. When this technology is used, video capturing and distance measurement information generation can be performed at the same time by one imaging element, and thus the above-described calibration work is not necessary.

In addition, as technology for classifying images according to each of pieces of information on distances to a subject, for example, technology disclosed in Japanese Patent Application Laid-Open No. 2016-143919 and Japanese Patent Application Laid-Open No. 2018-29270 are known. Japanese Patent Application Laid-Open No. 2016-143919 discloses technology for generating a histogram representing distribution frequency of a distance to a subject corresponding to image data to classify images of pieces of distance information according to the frequency of appearance of distance information. Japanese Patent Application Laid-Open No. 2018-29270 discloses technology for performing classification for each distance information included in a subject region by using a unit that recognizes the subject region in image data.

However, in a device of the related art, distance information is output as a numerical value or the like indicating a distance to a subject, or a heat map according to the distance information is displayed, and thus it is difficult for a photographer to intuitively understand whether or not a video into which CG is easily inserted has been captured.

In addition, Japanese Patent Application Laid-Open Nos. 2016-143919 and 2018-29270 disclose technology for classifying images for distance information, but there is a problem that the images are classified in accordance with only distance information to a subject, and distance information with few subjects appearing so that CG can be easily inserted in post-processing is not classified. Furthermore, there is a problem that it is difficult to intuitively understand what kind of distance layer MAP can be generated depending on conditions of an optical system.

Consequently, an object of the present invention is to provide an image processing device that can facilitate setting related to layer information based on distance information.

SUMMARY OF THE INVENTION

An image processing device includes at least one processor or circuit configured to function as an image acquisition unit configured to acquire an image including a subject through a lens unit, a distance information acquisition unit configured to acquire distance information indicating a distance to the subject, a layer information generation unit configured to generate layer information on a layer for each distance based on the distance information, and a setting unit configured to set a reference for generating the layer information and switch display of a setting value capable of being set in accordance with the lens information of the lens unit.

Further features of the present invention will become apparent from the following description of embodiments with reference to the attached drawings.

BRIEF DESCRIPTION OF THE DRAWINGS

FIG. 2(A) is a diagram illustrating an example of color filters disposed on a light receiving surface of an imaging element, and FIG. 2(B) is a diagram illustrating an example in which two photoelectric conversion units (photodiodes) are disposed in each pixel so as to correspond to an array of the color filters in FIG. 2(A).

FIG. 15 is a diagram illustrating a table in which examples of lens information to be acquired are collected according to the second embodiment.

FIGS. 16(A) and 16(B) are diagrams illustrating examples of tables acquired in step S1403.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

Further, in the embodiments, an example applied to a digital still camera as an image processing device will be described. However, the image processing device includes electronic equipment having an imaging function such as digital movie cameras, network cameras, smartphones with cameras, tablet computers with cameras, in-vehicle cameras, drone cameras, and cameras mounted on robots, and the like.

In addition, images in the embodiments include videos such as movies in addition to still images.

First Embodiment

Figure 1:
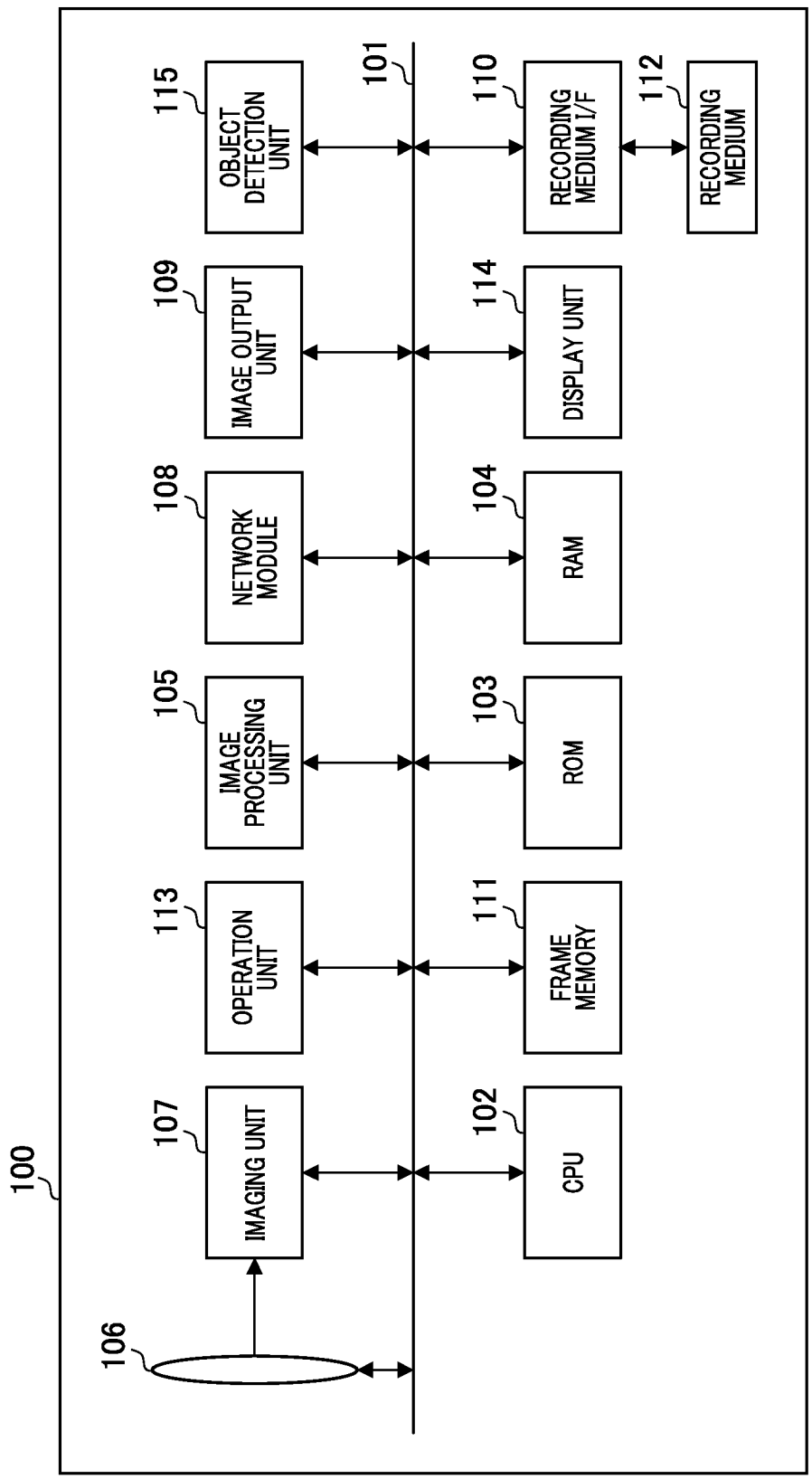
FIG. 1 is a block diagram of an image processing device according to a first embodiment.

FIG. 1 is a block diagram of an image processing device according to a first embodiment. In the drawing, an image processing device 100 is a device capable of inputting, outputting, and even recording images.

In FIG. 1, a CPU 102 as a computer, a ROM 103, a RAM 104, an image processing unit 105, a lens unit 106, an imaging unit 107, a network module 108, and an image output unit 109 are connected to an internal bus 101.

In addition, a recording medium interface (I/F) 110, an object detection unit 115, and the like are connected to the internal bus 101. The blocks connected to the internal bus 101 are configured to be able to transmit and receive data to and from each other via the internal bus 101.

In addition, some of the blocks illustrated in FIG. 1 are implemented by causing the CPU, which is a computer included in the image processing device, to execute computer programs stored in a memory such as a ROM as a storage medium. However, some or all of them may be implemented by hardware.

As hardware, a dedicated circuit (ASIC), a processor (a reconfigurable processor, a DSP), or the like can be used. In addition, the blocks illustrated in FIG. 1 may not be built in the same housing or may be constituted by separate devices connected to each other via signal paths.

The lens unit 106 is a unit constituted by a lens group including a zoom lens and a focus lens, an aperture mechanism, a drive motor, and the like. An optical image that has passed through the lens unit 106 is formed on a light receiving surface of the imaging unit 107.

The imaging unit 107 functions as an image acquisition unit that acquires an image including a subject, and includes an imaging element such as a CCD image sensor or a CMOS image sensor. An optical image formed on a light receiving surface of the imaging element is converted into an imaging signal and is further converted into a digital signal and output. In addition, the imaging element of the present embodiment is a sensor having an image surface phase difference detection function, and the details thereof will be described later.

The CPU 102 as a computer controls each unit of the image processing device 100 in accordance with computer programs stored in the ROM 103 and using the RAM 104 as a work memory.

Further, processing of flowcharts of FIGS. 3, 6, 8, 10, and 13 to 24 to be described later is executed in accordance with the computer programs stored in the ROM 103. The ROM 103 is a non-volatile semiconductor memory, and the computer program, various adjustment parameters, and the like for operating the CPU 102 are recorded therein.

The RAM 104 is a volatile semiconductor memory, and RAMs of which the speed and capacity lower than those of a frame memory 111 are generally used. The frame memory 111 is a semiconductor element that temporarily stores image signals and can read out the image signals when necessary. Since an image signal has a huge amount of data, a high-bandwidth and large-capacity memory is required.

Here, a dual data rate 4-synchronous dynamic RAM (DDR4-SDRAM) or the like is used. By using the frame memory 111, for example, processing such as synthesizing temporally different images or cutting out only a required region can be performed.

The image processing unit 105 performs various image processing on data from the imaging unit 107 or image data stored in the frame memory 111 or the recording medium 112 under the control of the CPU 102. The image processing performed by the image processing unit 105 includes pixel interpolation of image data, encoding processing, compression processing, decoding processing, enlargement/reduction processing (resizing), noise reduction processing, color conversion processing, and the like.

In addition, the image processing unit 105 corrects variations in characteristics of pixels of the imaging unit 107, or performs correction processing such as correction of defective pixels, correction of white balance, correction of luminance, or correction of distortion caused by characteristics of a lens or a decrease in the amount of peripheral light. In addition, the image processing unit 105 generates a distance map, but the details thereof will be described later.

Note that the image processing unit 105 may be constituted by a dedicated circuit block for performing specific image processing. In addition, the CPU 102 can also perform image processing in accordance with a program without using the image processing unit 105 depending on the type of image processing.

The CPU 102 controls the lens unit 106 to optically magnify an image and adjust an aperture for adjusting a focal length and the amount of light based on image processing results in the image processing unit 105. In addition, a camera shake may be corrected by moving a portion of the lens group within a plane perpendicular to an optical axis.

Reference numeral 113 denotes an operation unit that receives a user's operation as an interface for the outside of the device. The operation unit 113 is constituted by elements such as mechanical buttons and switches and includes a power switch, a mode changeover switch, and the like.

Reference numeral 114 denotes a display unit for displaying an image, and can allow, for example, an image processed by the image processing unit 105, a setting menu, and an operation state of the image processing device 100 to be confirmed. Regarding the display unit 114, a device having a small size and low power consumption such as a liquid crystal display (LCD) or an organic electroluminescence (EL) is used as a display device. Further, the display unit 114 has a touch panel structure using a thin film element of a resistive film type or an electrostatic capacitive type, and may be used as a portion of the operation unit 113.

The CPU 102 generates a character string for informing a user of a setting state of the image processing device 100 and a menu for setting the image processing device 100, superimposes them on an image processed by the image processing unit 105, and displays it on the display unit 114. In addition to character information, it is also possible to superimpose an imaging assist display such as a histogram, a vector scope, a waveform monitor, a zebra, a peaking, and a false color.

Reference numeral 109 denotes an image output unit, and as an interface, a serial digital interface (SDI), a high definition multimedia interface (HDMI: registered trademark), or the like is adopted as an interface. Alternatively, an interface such as a display port (registered trademark) may be used. A real-time image can be displayed on an external monitor or the like via the image output unit 109.

In addition, a network module 108 that can transmit not only images but also control signals is also provided. The network module 108 is an interface for inputting and outputting image signals and audio signals.

The network module 108 can also communicate with external devices via the Internet or the like and transmit and receive various data such as files and commands. The network module 108 may be a wired or wireless module.

The image processing device 100 also has a function of not only outputting images to the outside, but also recording them inside the device itself. The recording medium 112 is a large-capacity storage device such as a hard disc drive (HDD) or a solid state drive (SSD) capable of recording image data and various setting data, and can be mounted on the recording medium I/F 110.

The object detection unit 115, which is a block for detecting objects, performs object detection using, for example, artificial intelligence represented by deep learning using a neural network. In a case where object detection is performed using deep learning, the CPU 102 transmits a program for processing stored in the ROM 103, a network structure such as an SSD and a YOLO, weight parameters, and the like to the object detection unit 115.

Note that SSD stands for a single shot multibox detector, and YOLO stands for you only look once. The object detection unit 115 performs processing for detecting an object from an image signal based on various parameters obtained from the CPU 102, and expands processing results to the RAM 104.

FIG. 2(A) is a diagram illustrating an example of color filters disposed on the light receiving surface of the imaging element. FIG. 2(A) illustrates an example of a Bayer array of red (R), blue (B), and green (Gb, Gr), the imaging element has a plurality of pixels arranged in a two-dimensional pattern, any one color filter of R, B, Gb, and Gr is disposed on the front surface of each pixel as illustrated in FIG. 2(A).

Although only two rows of color filter arrays are illustrated in FIG. 2(A), two rows of such color filter arrays are repeatedly disposed in a vertical scanning direction. In addition, a microlens is disposed on the front surface of the color filter disposed on the front surface of each pixel of the imaging element, and each pixel has two photoelectric conversion units (a photodiode A and a photodiode B) disposed side by side in a horizontal scanning direction.

FIG. 2(B) is a diagram illustrating an example in which two photoelectric conversion units (photodiodes) are disposed in each pixel so as to correspond to the arrays of the color filters in FIG. 2(A). In FIG. 2(B), each pixel is constituted by a pair of photodiodes A and B, and color filters of the same color are disposed for the two paired photodiodes.

Note that the photodiode A and the photodiode B receive light beams from different exit pupils of the optical system via the microlenses.

In the imaging element of the present embodiment, A image signals can be acquired from a plurality of photodiodes A of the pixels arranged in a row direction. Similarly, B image signals can be acquired from a plurality of photodiodes B of the pixels arranged in the row direction. The A and B image signals are processed as signals for phase difference detection.

That is, for example, the CPU 102 or the image processing unit 105 performs a correlation operation between the A image signal and the B image signal, detects a phase difference between the A image signal and the B image signal, and calculates a subject distance based on the phase difference. That is, the CPU 102 or the image processing unit 105 functions as a distance information acquisition unit for acquiring distance information indicating a distance to a subject.

It is also possible to obtain a signal for an image (A image signal+B image signal) obtained by adding the signals of the two photodiodes A and B of each pixel, and the signal for an image obtained by the addition is processed by the image processing unit 105 as a color image signal corresponding to the Bayer array illustrated in FIG. 2(A).

In the imaging unit 107, it is also possible to output a phase difference detection signal (an A image signal, a B image signal) for each pixel, but it is also possible to output a value obtained by adding and averaging A image signals of a plurality of adjacent pixels and adding and averaging B signals of a plurality of adjacent pixels. By outputting the value obtained by adding and averaging, it is possible to shorten a period of time required to read out a signal from the imaging unit 107 and reduce the bandwidth of the internal bus 101.

The CPU 102 and the image processing unit 105 perform a correlation operation between two image signals by using a signal output from the imaging unit 107 having such an imaging element, and calculate information such as a defocus amount, parallax information, and various reliability based on a phase difference between the two image signals.

A defocus amount on a light receiving surface is calculated based on the shift (phase difference) between the A and B image signals. The defocus amount has positive and negative values, and a front focus or a rear focus can be determined depending on whether the defocus amount is a positive value or a negative value.

In addition, the degree of in-focus can be known using an absolute value of the defocus amount, and in-focus is achieved when the defocus amount is 0. That is, the CPU 102 calculates information regarding whether being a front focus or a rear focus based on whether the defocus amount is a positive value or a negative value, and calculates in-focus degree information which is the degree of in-focus (the amount of out-of-focus) based on the absolute value of the defocus amount.

The information regarding whether being a front focus or a rear focus is output in a case where the defocus amount exceeds a predetermined value, and information indicating in-focus is output in a case where the absolute value of the defocus amount is within the predetermined value.

The CPU 102 controls the lens unit 106 in accordance with the defocus amount to perform focus adjustment. In addition, the CPU 102 calculates a distance to a subject using the principle of triangulation from the phase difference information and the lens information of the lens unit 106.

In FIG. 2, an example in which pixels having two photodiodes as photoelectric conversion units disposed for one microlens are arranged in an array has been described. However, each pixel may be configured such that three or more photodiodes as photoelectric conversion units are disposed for one microlens. In addition, all of the pixels may not be configured as described above, and for example, pixels for distance detection among a plurality of pixels for image detection disposed in a two-dimensional pattern may be disposed discretely.

In this case, the pixel for distance detection may have a structure having two photodiodes as described above, or each pixel for distance detection may have a structure having only one of the photodiode A and the photodiode B.

In a case where only one of the photodiode A and the photodiode B is provided, the photodiode A and the photodiode B are disposed such that images of different pupil regions (exit pupils) of the lens unit are incident.

Alternatively, one light beam is shielded. In this manner, the present embodiment may provide a configuration in which two image signals, such as the A image signal and the B image signal, allowing phase difference detection are obtained, and is not limited to the above-described pixel structure. In addition, the imaging unit 107 may be a so-called stereo camera constituted by two imaging elements having parallax.

Figure 3:
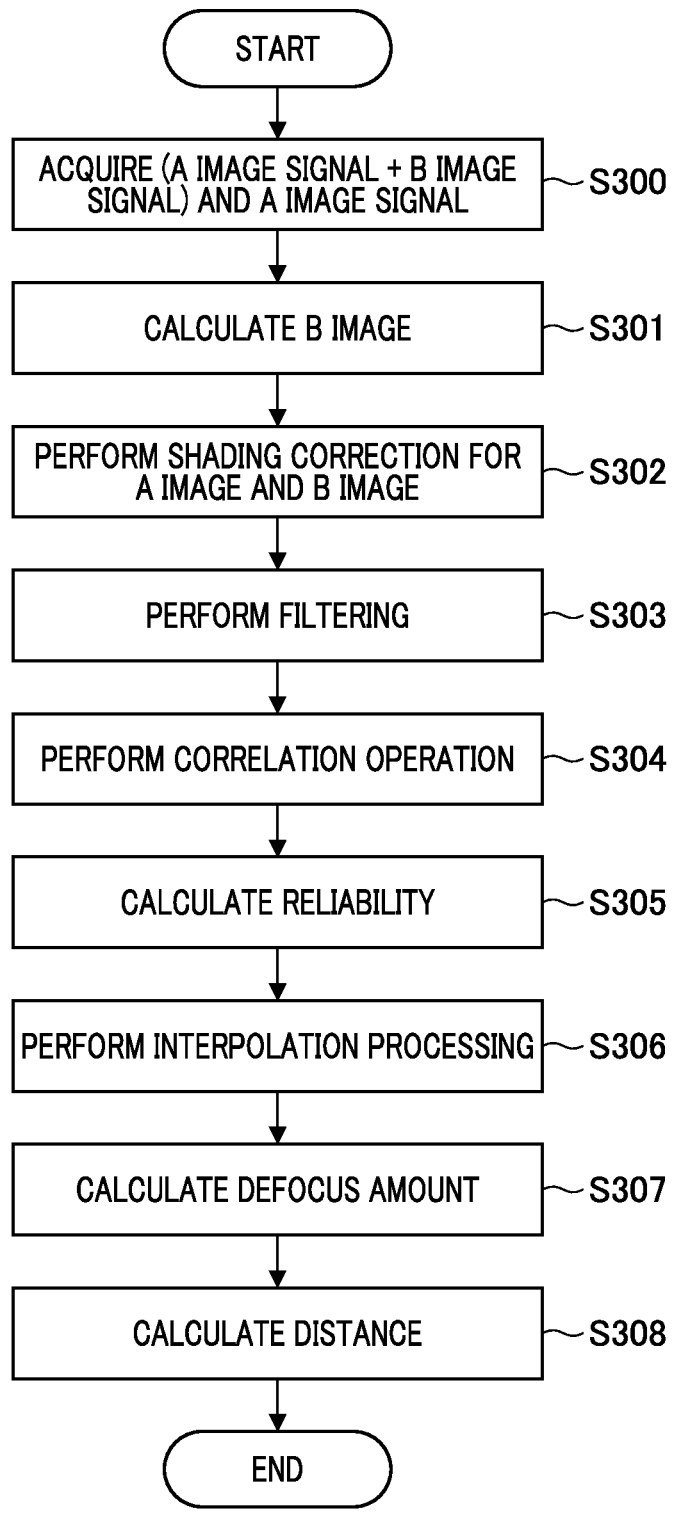
FIG. 3 is a flowchart illustrating distance information generation processing according to the first embodiment.

Next, distance information generation processing will be described with reference to FIGS. 3 to 5. FIG. 3 is a flowchart illustrating distance information generation processing according to the first embodiment. Note that operations of steps in the flowchart of FIG. 3 are performed by causing the CPU 102 as a computer to execute computer programs stored in the ROM 103 or the like as a storage medium.

In the flowchart of FIG. 3, first, in step S300, two signals of (A image signal+B image signal) for imaging and an A image signal for phase difference detection are acquired by being read out from the imaging unit 107. Next, in step S301, the image processing unit 105 calculates a B image signal for phase difference detection by obtaining a difference between the (A image signal+B image signal) and the A image signal.

Note that, in steps S300 and S301 described above, an example in which the B signal is calculated by reading the (A image signal+B image signal) and the A image signal and arithmetically operating a difference therebetween has been described. However, each of the A image signal and the B image signal may be read out from the imaging unit 107. Further, in a case where two image sensors are provided such as in a stereo camera, image signals output from the respective image sensors may be processed as an A image signal and a B image signal.

In step S302, optical shading correction is performed for each of the A image signal for phase difference detection and the B image signal for phase difference detection. In step S303, filtering is performed on each of the A image signal for phase difference detection and the B image signal for phase difference detection. For example, a low-frequency range is cut with a high-pass filter constituted by a FIR. Note that the signals may pass through a band-pass filter or a low-pass filter with different filter coefficients.

Next, in step S304, the A image signal for phase difference detection and the B image signal for phase difference detection, which have been subjected to the filtering in step S303, are divided into minute blocks and subjected to a correlation operation. Note that there are no restrictions on the size or shapes of the minute blocks, and regions may overlap each other by adjacent blocks.

Hereinafter, a correlation operation between an A image signal and a B image signal, which are a pair of images, will be described. A signal string of A image signals at the position of a target pixel is denoted by $E(1)$ to $E(m)$, and a signal string of B image signals at the position of a target pixel is denoted by $F(1)$ to $F(m)$. A correlation amount $C(k)$ in a deviation amount k between two signal strings is arithmetically operated using the following Formula (1) while relatively shifting the signal string $F(1)$ to $F(m)$ of the B image signals with respect to the signal string $E(1)$ to $E(m)$ of the A image signals.

$$C(k)=\Sigma\Sigma|E(n)-F(n+k)| \qquad (1)$$

In Formula (1), $\Sigma$ operation means an arithmetic operation of calculating a sum for n. In the $\Sigma$ operation, the range that n and n+k can take is limited to a range from 1 to m. The deviation amount k is an integer value and is a relative pixel deviation amount in units of detection pitches of a pair of pieces of data.

Figure 4:
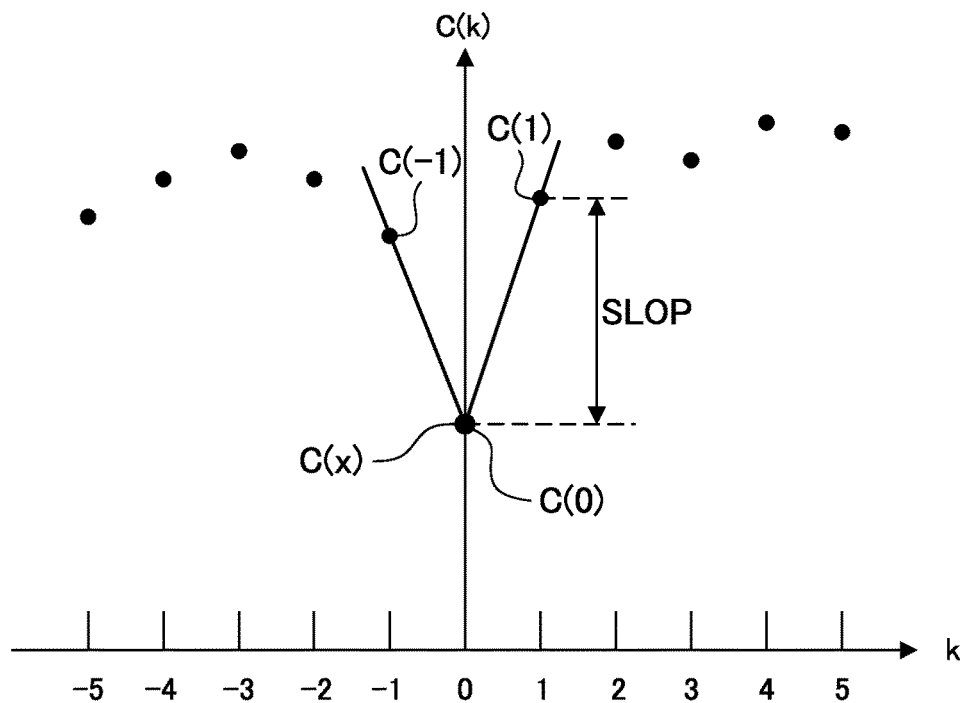
FIG. 4 is a diagram illustrating arithmetic operation results of Formula (1) in a case where a correlation between a pair of image signal strings is high in an ideal state where there is no noise.

FIG. 4 is a diagram illustrating arithmetic operation results of Formula (1) in a case where a correlation between a pair of image signal strings is high in an ideal state where there is no noise.

As illustrated in FIG. 4, a correlation amount C(k), which is a difference, is minimized in a deviation amount (k=kj=0) in which a correlation between a pair of image signal strings is high. Hereinafter, k when a discrete correlation amount C(k) is minimized is denoted by kj. By three-point interpolation processing shown in Formulas (2) to (4), x that gives the minimum value C(x) for a continuous correlation amount is calculated. Note that the pixel deviation amount x is a real number, and the unit is pixel.

$$x = kj + \frac{D}{SLOP} \quad (2)$$

$$D = \frac{\{C(kj-1) - C(kj+1)\}}{2} \quad (3)$$

$$SLOP = MAX\{C(kj+1) - C(kj), C(kj-1) - C(kj)\} \quad (4)$$

SLOP in Formula (4) represents a slope of a change between a smallest and minimum correlation amount and a correlation amount adjacent thereto. In FIG. 4, a specific example is as follows.

C(kj)=C(0)=1000

C(kj−1)=C(−1)=1700

C(kj+1)=C(1)=1830

In this example, kj=0. From Formulas (2) to (4), the following is obtained.

SLOP=830 x=−0.078 pixels

Note that, in the case of an in-focus state, 0.00 is an ideal value for a pixel deviation amount x between a signal string of A image signals and a signal string of B image signals.

Figure 5:
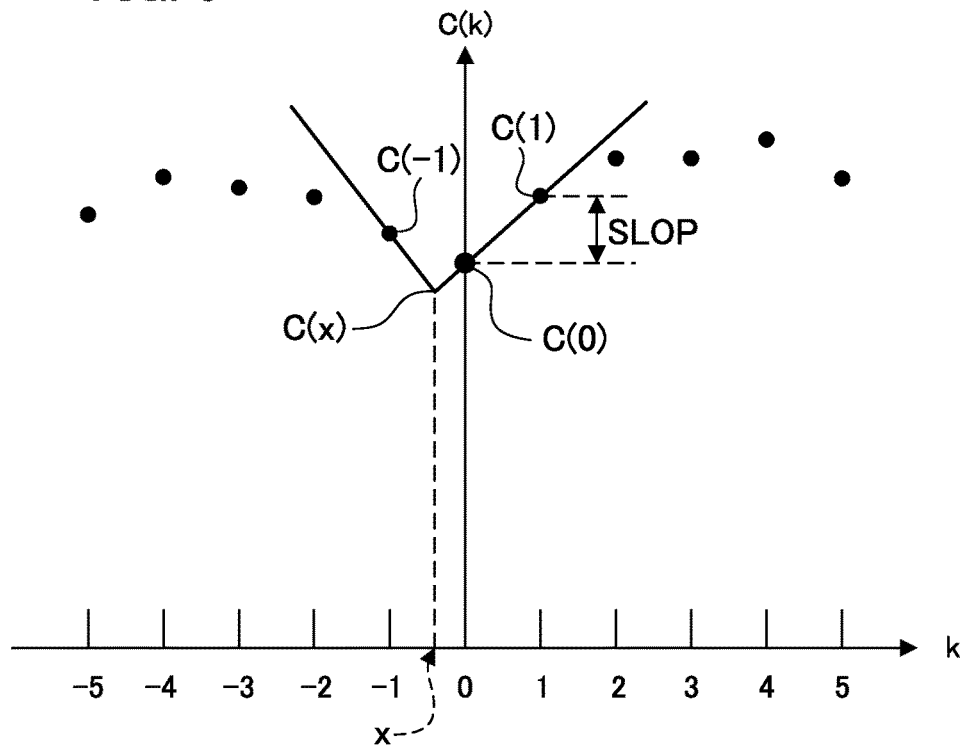
FIG. 5 is a diagram illustrating arithmetic operation results in a case where Formula (1) is applied to a minute block in which there is noise.

On the other hand, FIG. 5 is a diagram illustrating arithmetic operation results in a case where Formula (1) is applied to a minute block having noise. As illustrated in FIG. 5, a correlation between a signal string of A image signals and a signal string of B image signals decreases due to the influence of noise distributed randomly. A minimum value of the correlation amount C(k) becomes larger than the minimum value illustrated in FIG. 4, and the curve of the correlation amount has an overall flat shape (a shape in which a difference absolute value between a maximum value and a minimum value is small).

In FIG. 5, a specific example is as follows.

C(kj)=C(0)=1300

C(kj−1)=C(−1)=1480

C(kj+1)=C(1)=1800

In this example, kj=0. From Formulas (2) to (4), the following is obtained.

SLOP=500 x=−0.32 pixels

That is, compared to the arithmetic operation results without noise illustrated in FIG. 4, the pixel deviation amount x is far from an ideal value.

In a case where a correlation between a pair of image signal strings is low, the amount of change in a correlation amount C(k) decreases, the curve of the correlation amount has an overall flat shape, and thus the value of SLOP decreases. In addition, even in a case where a subject image has a low contrast, a correlation between the pair of image signal strings is similarly reduced, and a curve of a correlation amount has a flat shape.

Based on this property, the reliability of the calculated pixel deviation amount x can be determined by the value of SLOP. That is, in a case where the value of SLOP is large, the correlation between the pair of image signal strings is high, and in a case where the value of SLOP is small, it can be determined that no significant correlation has been obtained between the pair of image signal strings.

Note that, in the present embodiment, Formula (1) is used for a correlation operation, the correlation amount C(k) is the smallest and minimum in a shift amount where the correlation between the pair of image signal strings is the highest. However, a correlation operation method in which a correlation amount C(k) is the largest and maximum in a shift amount where the correlation between the pair of image signal strings is the highest may be used.

Next, in step S305, the reliability is calculated. As described above, the reliability can be calculated based on C(kj), which indicates the degree of matching between two images which is calculated in step S304, and the value of SLOP.

Next, interpolation processing is performed in step S306. Although the correlation operation has been performed in step S304, the reliability calculated in step S305 is low, and thus the reliability may not be adopted as a pixel deviation amount.

In this case, interpolation processing is performed using a pixel deviation amount calculated from the surrounding pixels. As an interpolation method, a median filter may be applied, or an arithmetic operation of reducing data of a pixel deviation amount and then expanding the data again may be performed. In addition, color data may be extracted from (A image signal+B image signal) for imaging, and a pixel deviation amount may be interpolated using the color data.

Next, in step S307, a defocus amount is calculated with reference to the amount x calculated in step S304. Specifically, the defocus amount (denoted by DEF) can be obtained by the following Formula (5).

$$DEF = P \cdot x \quad (5)$$

In Formula (5), P is a conversion coefficient determined by a detection pitch (pixel arrangement pitch) and a distance between projection centers of two right and left viewpoints in a pair of parallax images, and the unit is mm/pixel.

Next, in step S308, the distance is calculated from the defocus amount calculated in step S307. When a distance to a subject is Da, a focal position is Db, and a focal length is F, the following Formula (6) is approximately established.

$$\frac{1}{Db} - \frac{1}{Da} = \frac{1}{F} \quad (6)$$

Thus, the distance Da to the subject is represented by Formula (7).

$$Da = \frac{Db \cdot F}{F - Db} \quad (7)$$

Thus, when DEF=0, Db is set to be Db0, Formula (7) becomes the following Formula (8), and an absolute distance to the subject can be obtained.

$$Da' = \frac{(Db0 - DEF) \cdot F}{F - (Db0 - DEF)} \quad (8)$$

On the other hand, the relative distance is Da-Da', and can be obtained by the following Formula (9) from Formulas (7) and (8).

$$Da - Da' = \frac{DEF \cdot F^2}{(F - Db0)^2 + DEF \cdot (F - Db0)} \quad (9)$$

As described above, when a correlation operation is performed in accordance with the flowchart of FIG. 3, a pixel deviation amount, a defocus amount, and distance information can be calculated from an A image signal for phase difference detection and a B image signal for phase difference detection. That is, distance information can be acquired based on a phase difference between outputs of a plurality of photoelectric conversion units. Note that the distance information in the present embodiment may be distance data itself or may be a shift amount or a defocus amount, and the distance information includes them.

<Processing for Generating Distance Layer MAP Using Histogram>

Next, processing for generating the distance layer MAP in the first embodiment will be described with reference to FIGS. 6 to 8.

Figure 6:
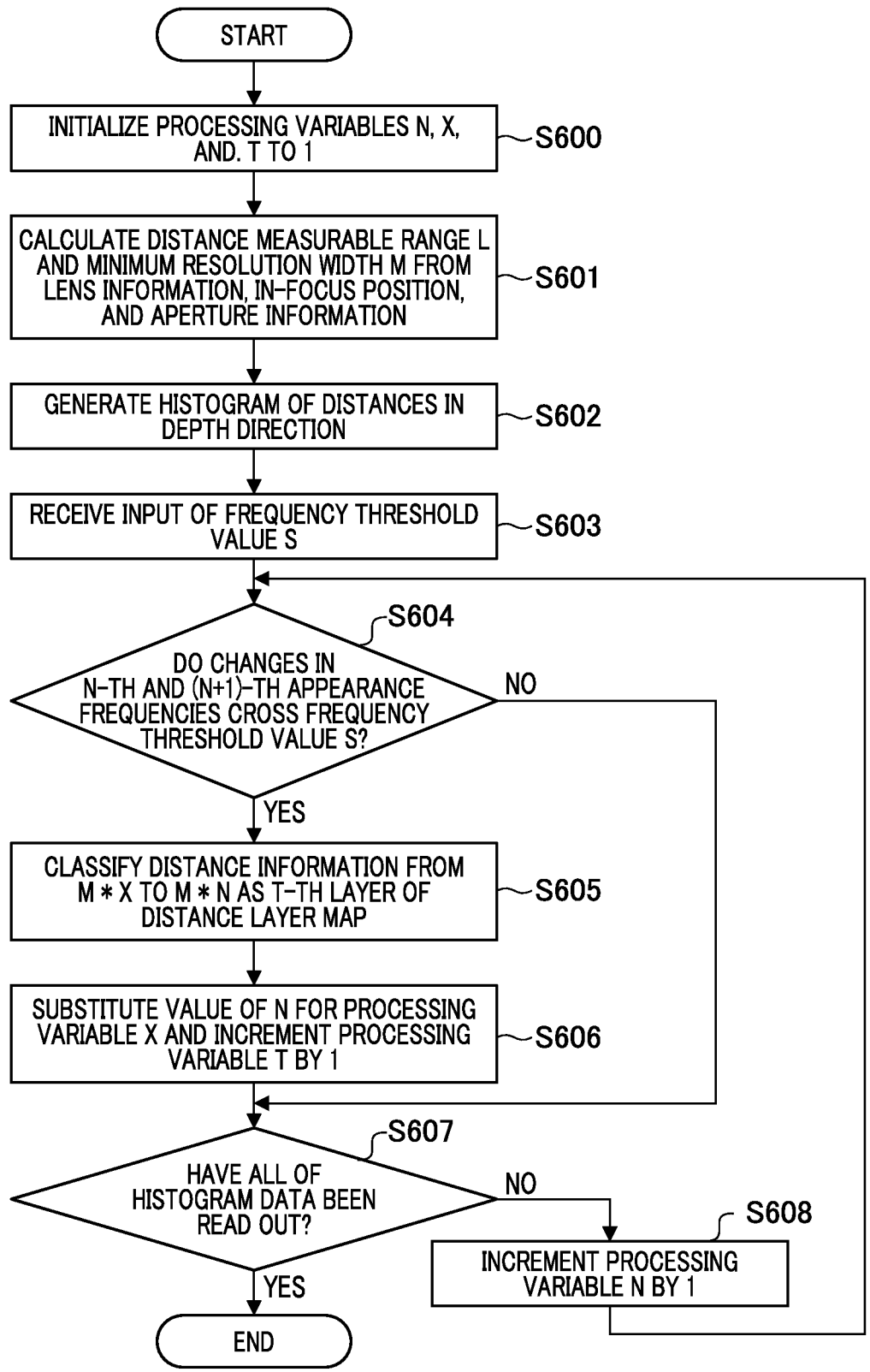
FIG. 6 is a flowchart illustrating an example in which distance information is converted into a distance layer MAP using a histogram, according to the first embodiment.

FIG. 6 is a flowchart illustrating an example in which distance information is converted into a distance layer MAP using a histogram according to the first embodiment. Note that operations of steps in the flowchart of FIG. 6 are performed by causing the CPU 102 as a computer to execute computer programs stored in the ROM 103 or the like as a storage medium.

In step S600 of FIG. 6, the CPU 102 initializes each of values of an internal processing variable N, a processing variable X, and a processing variable T to 1. Here, the processing variable N is a variable for counting the number of times of processing, the processing variable X is a temporary variable for calculation, and the processing variable T is a variable indicating a layer number.

Next, in step S601, the CPU 102 acquires an in-focus position and lens aperture information as lens information and distance information from the lens unit 106 and the imaging unit 107, and calculates a distance measurable range L and a minimum resolution width M of a subject distance.

Next, in step S602, the CPU 102 generates a histogram showing a distribution of distances in which the subject exists in a depth direction based on the distance information. FIG. 7 is a diagram illustrating an example of the histogram generated in step S602.

The horizontal axis is a distance in the depth direction, and the vertical axis is the number of times of appearance of distance information. The histogram data is generated by accumulating distance information appearing in units of the minimum resolution width M within the distance measurable range L. The CPU 102 tags the data of the generated histogram with numbers starting from 1 in ascending order of a distance from the image processing device 100 in units of the minimum resolution width M, and stores the data in the RAM 104.

Next, in step S603, the operation unit 113 receives an input for setting a frequency threshold value S from the user. The user transmits information on the frequency threshold value S to the CPU 102 via the operation unit 113. Note that, instead of receiving the user's setting through the operation unit 113, the frequency threshold value S may be set from an external device in a wireless manner through the network module 108.

Next, in step S604, the CPU 102 reads histogram data of a processing variable N and histogram data of a processing variable N+1 from the RAM 104. In addition, it is determined whether or not changes in the number of times of appearance of distance information of the processing variable N and the processing variable N+1 cross the frequency threshold value S. In a case where the change crosses the frequency threshold value S, the CPU 102 proceeds to step S605, and in a case where the change does not cross the frequency threshold value S, the CPU 102 proceeds to step S607.

In step S605, the CPU 102 classifies distance information from the minimum resolution width M*the processing variable X to the minimum resolution width M*the processing variable N as a T-th layer of the distance layer MAP. Next, in step S606, the CPU 102 substitutes the value of the processing variable N+1 for the processing variable X and increments the value of the processing variable T by 1.

Next, in step S607, the CPU 102 determines whether or not all of the histogram data stored in the RAM 104 have been read out. When all of the histogram data have been read out, the CPU 102 proceeds to a termination step, and when all of the histogram data have not been read out, the CPU 102 proceeds to step S608. Next, in step S608, the CPU 102 increments the value of the processing variable N by 1 and returns to step S604.

In the first embodiment described above, according to the flowchart of FIG. 6, it is possible to generate a histogram based on distance information and classify (generate) a distance layer MAP of a layer with a large number of subjects and a layer with a small number of subjects in a depth direction. In addition, each layer can be numbered in ascending order of a distance from the image processing device 100.

In this manner, in the flowchart of FIG. 6, a reference number of layers (the number of layers) and a reference layer width (the width of a layer in a distance direction) for generating layer information are changed depending on an image. Here, the CPU 102 functions as a layer information generation step (layer information generation unit) for generating a histogram based on distance information and generating layer information for each distance based on the histogram by executing steps S600 to S608.

Figure 7:
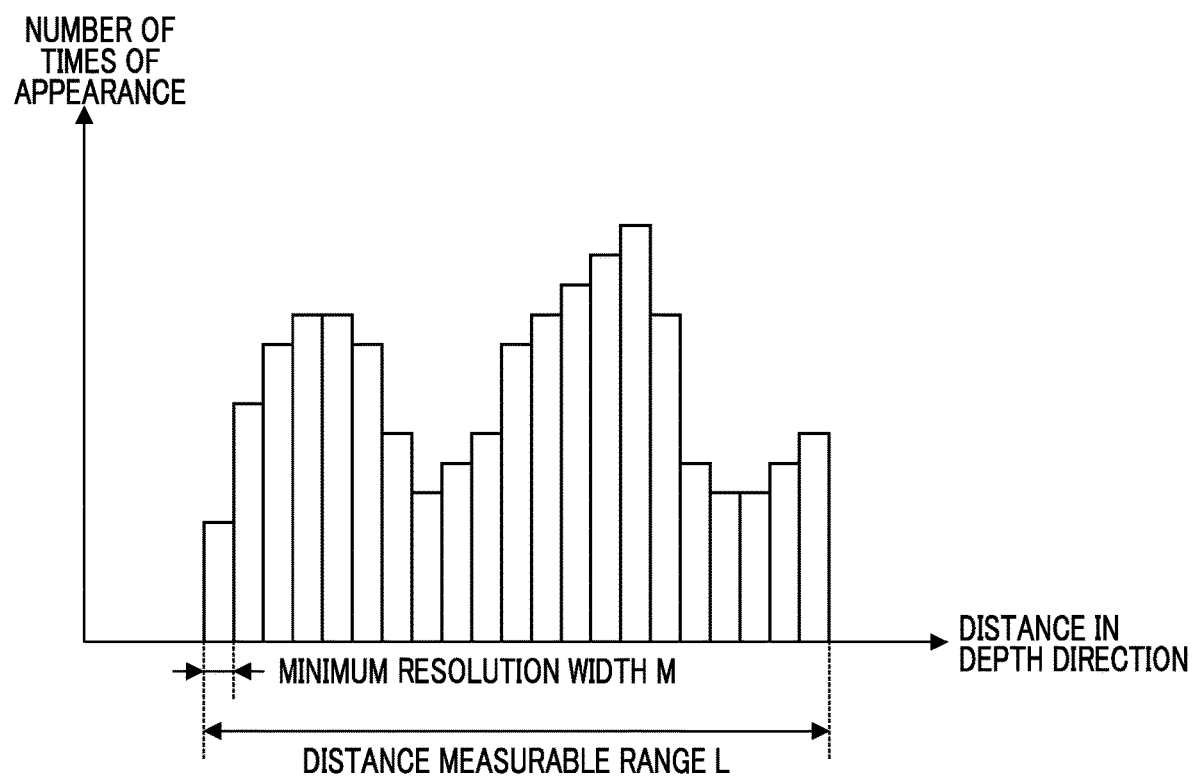
FIG. 7 is a diagram illustrating an example of a histogram generated in step S602.

In FIGS. 6 and 7, a method of classifying (generating) a distance layer MAP by using a histogram has been described, but a subject may be recognized by an image recognition unit, and a distance layer MAP may be classified (generated) in accordance with the recognized subject.

Figure 8:
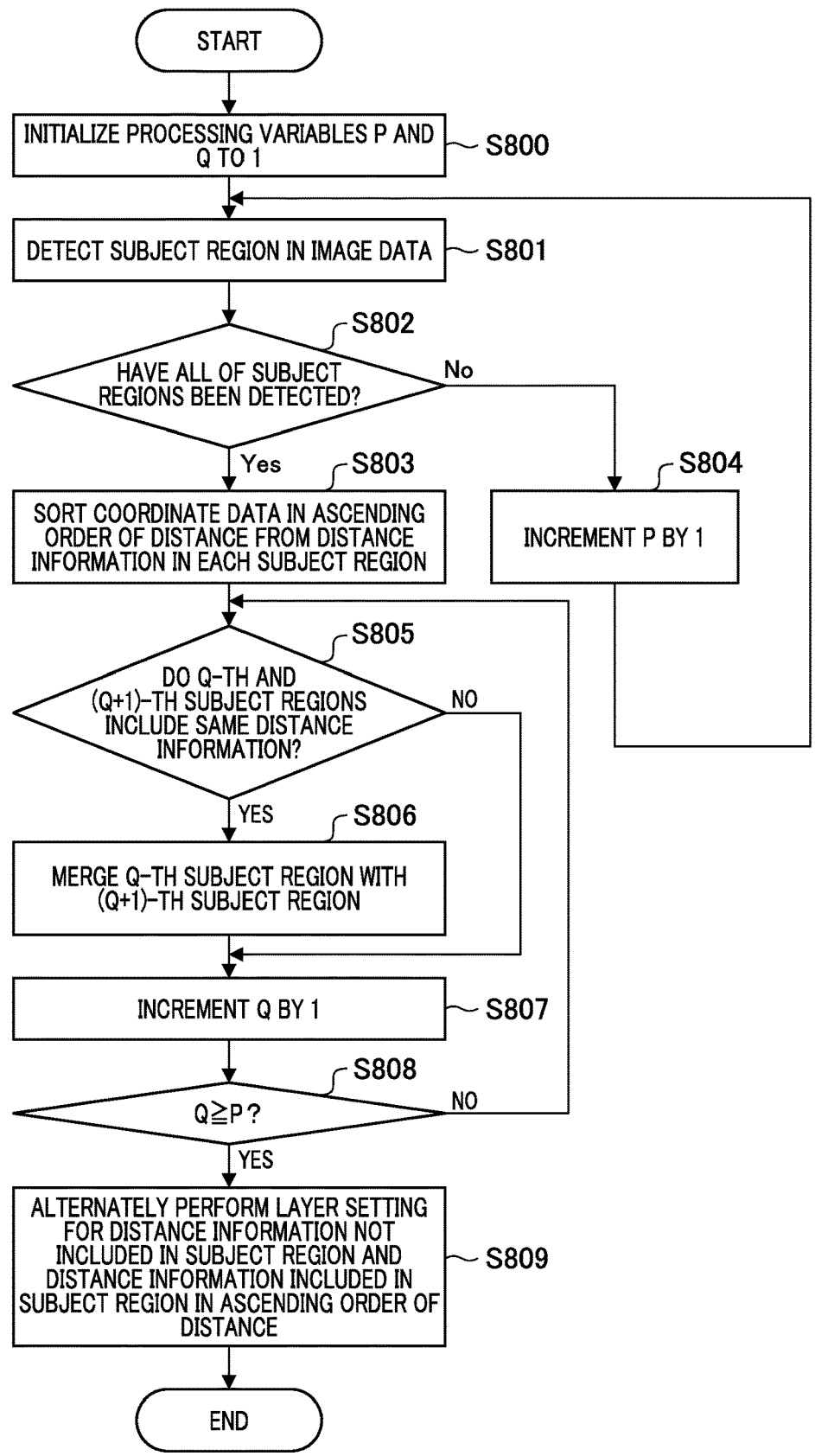
FIG. 8 is a flowchart illustrating processing for converting distance information into a distance layer MAP using an image recognition unit.

FIG. 8 is a flowchart illustrating processing for converting distance information into a distance layer MAP by using the image recognition unit.

Note that operations of steps in the flowchart of FIG. 8 are performed by causing the CPU 102 as a computer to execute computer programs stored in the ROM 103 or the like as a storage medium.

In step S800, the CPU 102 initializes each of values of a processing variable P and a processing variable Q to 1. Here, the processing variable P is a variable for counting the number of recognized subjects, and the processing variable Q is a temporary variable for executing processing.

Next, in step S801, the object detection unit 115 detects a subject in image data. The object detection unit 115 stores the subject in the RAM 104 as coordinate data indicating in which region in the image data the subject appears. Here, the coordinate data is data representing the outline of the subject.

Next, in step S802, the CPU 102 determines whether all of the subjects in the image data have been detected. In a case where all of the subjects have been detected, the CPU 102 proceeds to step S803 and in a case where all of the subjects have not been detected, the CPU 102 proceeds to step S804.

In step S803, the CPU 102 sorts the coordinate data of the detected subjects stored in the RAM 104 in ascending order of a distance from the image processing device 100 based on distance information of a subject region, numbers them in order from the first, and then proceeds to step S805.

On the other hand, in step S804, the CPU 102 increments the value of the processing variable P by 1 and then returns to step S801.

In step S805, the CPU 102 determines whether or not the same distance information is included in a subject region indicated by coordinate data of a subject of a processing variable Q and a subject region indicated by coordinate data of a subject of a processing variable Q+1 which are stored in the RAM 104. In a case where the same distance information is included, the CPU 102 proceeds to step S806, and in a case where the same distance information is not included, the CPU 102 proceeds to step S807.

In step S806, the subject region indicated by the coordinate data of the subject of the processing variable Q and the subject region indicated by the coordinate data of the subject of the processing variable Q+1, which are stored in the RAM 104, are merged with each other as a subject region indicated by the coordinate data of the subject of the processing variable Q+1. Then, the subject region is stored in the RAM 104.

Next, in step S807, the CPU 102 increments the processing variable Q by 1. Next, in step S808, the CPU 102 determines whether or not the value of the processing variable Q is equal to or greater than the value of the processing variable P. In a case where the value of the processing variable Q is equal to or greater than the value of the processing variable P, the CPU 102 proceeds to step S809, and otherwise, returns to step S805.

In step S809, the setting of the number of layers of a distance layer MAP is alternately allocated in ascending order of a distance from the image processing device 100 for distance information for each subject region indicated by coordinate data of a subject stored in the RAM 104 and distance information which is not included in any subject region. Thereby, a layer where a subject exists and a layer where a subject does not exist are generated.

As described above, according to the flowchart of FIG. 8, distance information can be classified into a distance layer MAP constituted by a layer with a large number of subjects in a depth direction and a layer with a small number of subjects by using the image recognition unit. In addition, each layer can be numbered in ascending order of a distance from the image processing device 100.

In this manner, in the flowchart of FIG. 8, a reference number of layers (the number of layers) and a reference layer width (the width of a layer in a distance direction) for generating layer information are changed depending on an image.

Note that, regarding the subject detected in step S801, a type such as a body, a face, or a car may be selectable. That is, the width of a layer in a distance direction for each distance may be changed in accordance with the type of subject recognized. In addition, one or a plurality of subjects may be selectable.

In addition, the processes of steps S800 to S804 may be performed for each frame, and the accuracy of image recognition may be improved using results of a plurality of frames to perform step S805 and the subsequent steps. That is, layer information may be generated based on images of a plurality of frames.

In this manner, the CPU 102 executes steps S800 to S809 as layer information generation steps to recognize a subject by the image recognition unit and functions as a layer information generation unit that generates layer information for each distance in accordance with the recognized subject.

In addition, a method of recognizing a subject by an image recognition unit and classifying (generating) a distance layer MAP in accordance with the recognized subject, and a method of generating a histogram based on distance information and classifying (generating) a distance layer MAP based on the histogram may be combined.

<Method of Presenting to User into which Layer of Distance Layer MAP CG is to be Inserted>

Next, a method of presenting to a user (photographer or the like) into which layer of a distance layer MAP classified in the above-described first embodiment CG is to be inserted will be described with reference to FIGS. 9 to 12. Here, a case where layer information and coordinate information for inserting CG into the image processing device 100 are transmitted from a portable terminal is described.

Figure 9:
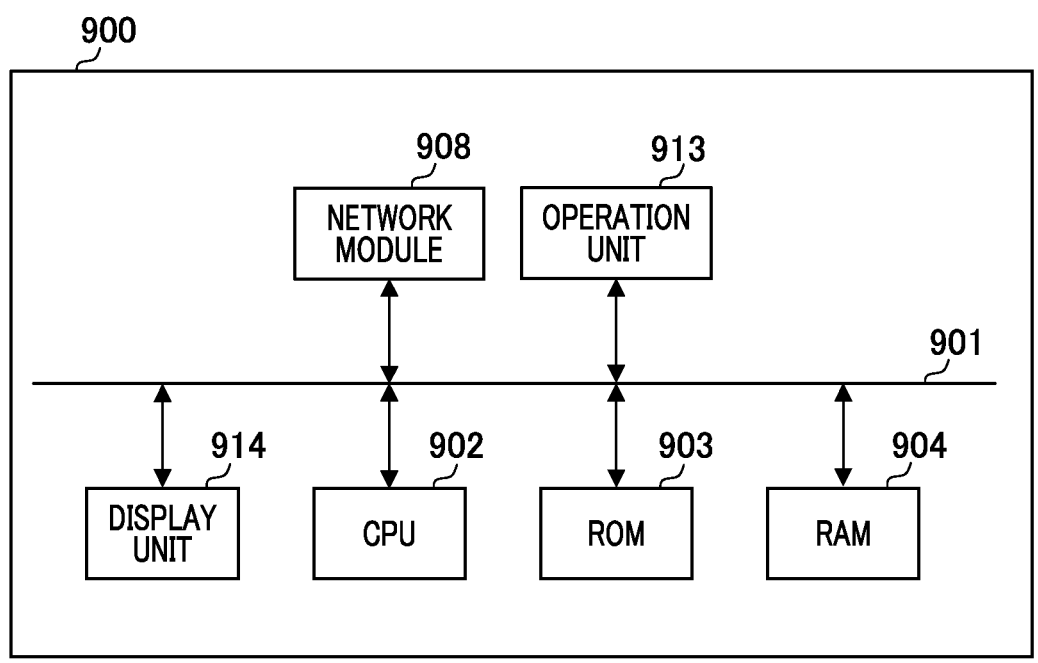
FIG. 9 is a block diagram illustrating an internal configuration example of a portable terminal according to the first embodiment.

FIG. 9 is a block diagram illustrating an example of an internal configuration of a portable terminal according to the first embodiment. In the drawing, in a portable terminal 900, layer information and coordinate information can be set by a user, and setting values thereof can be transmitted in a wireless manner.

In FIG. 9, a network module 908, an operation unit 913, a display unit 914, a CPU 902, a ROM 903, and a RAM 904 are connected to an internal bus 901. The units connected to the internal bus 901 can transmit and receive data to and from each other through the internal bus 901.

The CPU 902 controls each unit of the portable terminal 900 in accordance with computer programs stored in the ROM 903 and using the RAM 904 as a work memory.

The ROM 903 is a non-volatile recording element, and programs for operating the CPU 902, various adjustment parameters, and the like are recorded therein.

The display unit 914 is a display for displaying various setting states, data (including digital image data and analog image signals) received from the network module 908, and the like under the control of the CPU 902. The operation unit 913 is a power switch for supplying power to the portable terminal 900, or is an operation unit that receives a user's operation such as setting of layer information and coordinate information.

Note that, in a case where the operation unit 913 includes a touch panel, the CPU 902 detects that the touch panel has been touched with a finger or a pen (hereinafter referred to as a touch-down) or that the touch panel is being touched with the finger or the pen (hereinafter referred to as a touch-on).

In addition, it is possible to detect that the touch panel is moving while being touched with the finger or the pen (hereinafter referred to as a move), that the finger or the pen touching the touch panel is removed from the touch panel (hereinafter referred to as a touch-up), and a state where the touch panel is touched with nothing (hereafter referred to as a touch-off).

The CPU 902 is notified of these operations and positional coordinates where the touch panel is touched with the finger or the pen, and the CPU 902 determines what kind of operation has been performed on the touch panel based on the notified information. Regarding the move, the moving direction of the finger or the pen moving on the touch panel can also be determined for each vertical component and horizontal component on the touch panel based on changes in positional coordinates.

In addition, when a touch-up has been performed on the touch panel through a certain move after a touch-down is performed, it is assumed that a stroke has been drawn. An operation of rapidly drawing a stroke is called a flick. The flick is an operation of rapidly moving a finger by a certain degree of distance while touching the touch panel with the finger and then removing the finger as it is. In other words, the flick is an operation of rapidly tracing the touch panel as if the touch panel is flicked with a finger.

When it is detected that a move has been performed at a predetermined distance or more at a predetermined speed or more, and a touch-up is detected as it is, it can be determined that a flick has been performed. Further, in a case where it is detected that a move has been performed at a predetermined distance or more at less than a predetermined speed, it is determined that a drag has been performed.

As the touch panel, any type of touch panel may be used among various types of touch panels such as a resistive film type, a capacitance type, a surface acoustic wave type, an infrared type, an electromagnetic induction type, an image recognition type, and an optical sensor type.

The network module 908 transmits and receives data to and from external devices such as an external camera and a personal computer by wireless communication under the control of the CPU 902. As the data, setting information, operation information, and the like of the image processing device 100 are received, and additional information recorded together with a command for operating the image processing device 100 and image data, and the like are transmitted. The data that can be transmitted and received includes digital image data and analog image signals.

Figure 10:
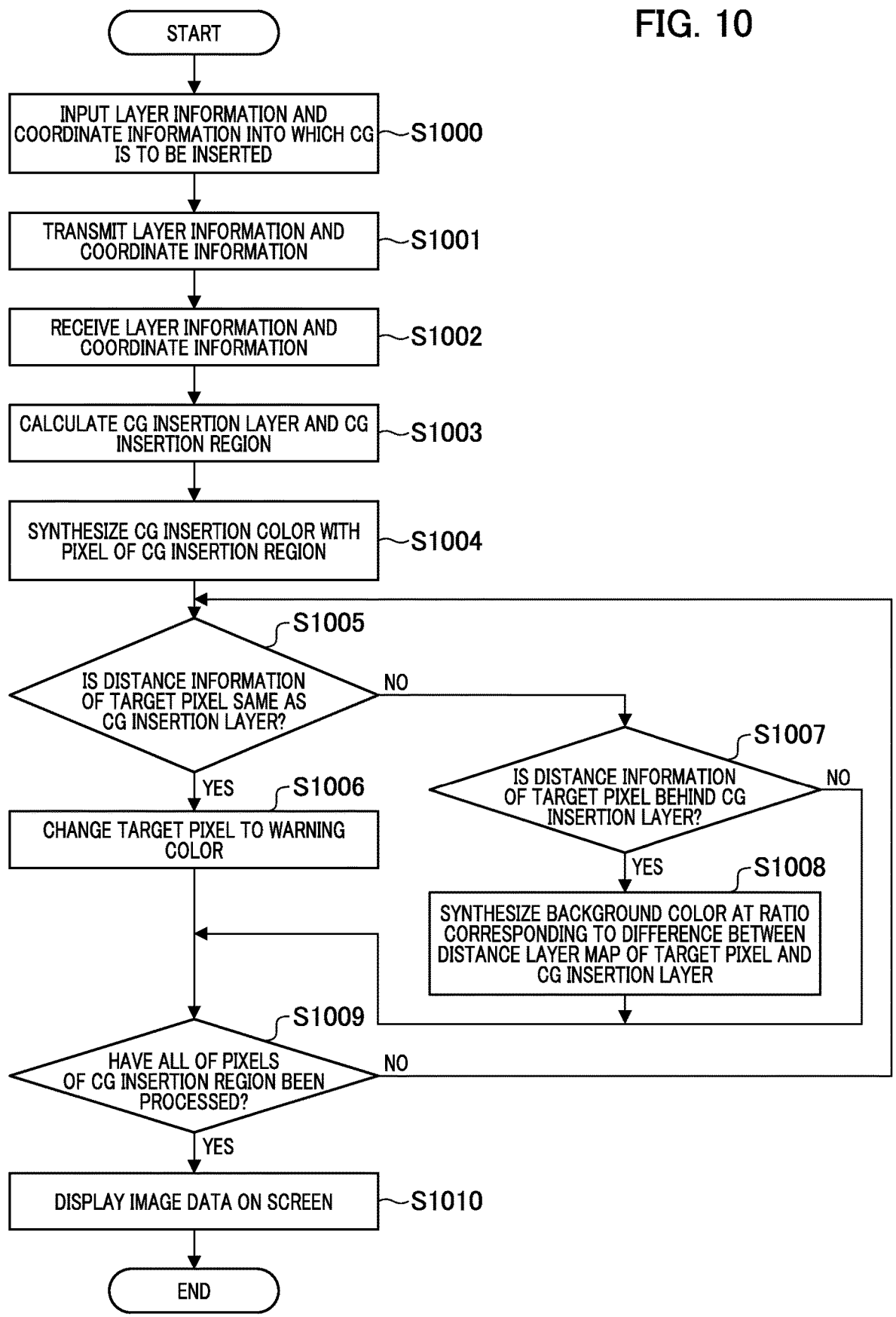
FIG. 10 is a flowchart illustrating an example for presenting to a photographer into which layer of the distance layer MAP CG are to be inserted.

FIG. 10 is a flowchart illustrating an example for presenting to a photographer into which layer of a distance layer MAP CG is to be inserted. Note that operations of steps in the flowchart of FIG. 10 are performed by causing the CPU 102 of the image processing device 100 and the CPU 902 of the portable terminal 900 to execute computer programs stored in the ROM 103, the ROM 903, or the like as a storage medium.

In step S1000, the CPU 902 of the portable terminal 900 receives setting of layer information and coordinate information from the user via the operation unit 913.

Here, the layer information is a value for designating into which layer of the distance layer MAP the CG is to be inserted. Alternatively, an image may be transmitted from the image processing device 100 to the portable terminal 900, a subject may be selected, and the front and back of the selected subject may be selected as a layer. The coordinate information is coordinate information for designating where on a screen CG is to be inserted.

Next, in step S1001, the CPU 902 of the portable terminal 900 transmits the layer information and the coordinate information that are set in step S1000 to the network module 108 inside the image processing device 100 via the network module 908.

Note that the above-described layer information and coordinate information may be transmitted to the image processing device 100 at a timing when the portable terminal 900 transmits a command for operating the image processing device 100, additional information to be added to image data and recorded, and the like to the image processing device 100. Here, steps S1000 and S1001 function as steps for setting a synthesized image insertion region for inserting a synthesized image and insertion layer information which is a layer for inserting a synthesized image for an image.

Next, in step S1002, the CPU 102 in the image processing device 100 receives the layer information and the coordinate information via the network module 108. Next, in step S1003, the CPU 102 calculates a CG insertion layer from the layer information and calculates a CG insertion region in the image data from the coordinate information.

Next, in step S1004, the CPU 102 synthesizes a CG insertion color with a pixel corresponding to the position of the CG insertion region of the image data. Here, the CG insertion color is a color representing the position where CG is expected to be inserted in post-processing. The CG insertion color may be a color set separately by the user.

Next, in step S1005, the CPU 102 determines whether a layer (layer information) of a distance layer MAP of a target pixel (subject pixel) corresponding to the position of the CG insertion region of the image data is the same as the CG insertion layer (layer information). In a case where the layer is the same as the CG insertion layer, the CPU 102 proceeds to step S1006, and in a case where the layer is different from the CG insertion layer, the CPU 102 proceeds to step S1007.

Next, in step S1006, the CPU 102 controls the image processing unit 105 to change data of a pixel corresponding to the position of the CG insertion region of the image data of the subject to a predetermined color for warning (warning color). Here, the warning color is a color representing that a subject exists at the same position of the CG insertion region where CG is expected to be inserted in post-processing. The warning color may be a color set separately by the user.

Note that, in addition to using a warning color, for example, a predetermined pattern (for example, a dot pattern, a stripe pattern, or the like) different from the other regions may be displayed. In this manner, in the present embodiment, in a case where layer information of an image of a subject and insertion layer information for inserting a synthesized image are the same, an overlapping region is displayed in a predetermined color (warning color) or a predetermined patter which is different from the other regions.

On the other hand, in step S1007, it is determined whether or not the layer of the distance layer MAP of the pixel corresponding to the position of the CG insertion region of the image data of the subject is behind the CG insertion layer. When the layer is behind the CG insertion layer, the CPU 102 proceeds to step S1008, and the layer is before the CG insertion layer, the CPU 102 proceeds to step S1009.

In step S1008, the CPU 102 controls the image processing unit 105 to synthesize the data of the pixel of the subject corresponding to the position of the CG insertion region with a background with a transmittance according to a distance between the distance layer MAP of the pixel and the CG insertion layer.

For example, when the distance layer MAP of the pixel of the subject is classified immediately behind the CG insertion layer, the transmittance of a front image is decreased so that the image of the subject is displayed to be thinner. On the other hand, when the distance layer MAP is classified as a back layer far away from the CG insertion layer, the transmittance of the front image is increased so that a background subject is displayed darkly. In this manner, the photographer easily ascertains the sense of distance between CG to be inserted and the subject.

Note that the transmittance of the overlapping region of the front image can be changed in the same manner regardless of which side is behind. That is, as a distance between the layer information of the image of the subject and the insertion layer information for inserting a synthesized image increases, the transmittance of the front image in the overlapping region may be changed.

Note that, in the present embodiment, as a distance between layer information of an image of a subject and insertion layer information for inserting a synthesized image increases, the transmittance of a front image in an overlapping region is increased and displayed. In contrast, however, the transmittance may be decreased and displayed.

On the other hand, in step S1009, the CPU 102 determines whether or not all of the pixels of the subject corresponding to the position of the CG insertion region have been processed. In a case where all of the pixels have been processed, the CPU 102 proceeds to step S1010, and in a case where all of the pixels have not been processed, the CPU 102 proceeds to step S1005.

Next, in step S1010, the CPU 102 displays, on the display unit 114, the image data in which the warning color generated in the processes of steps S1005 to S1009 and the background subject color are synthesized.

Here, by executing steps S1004 to S1010 as display control steps, the steps function as a display control unit that displays an overlapping region where the synthesized image and the image of the subject overlap each other in a predetermined color or pattern corresponding to the layer information of the subject.

Note that, in the present embodiment, although data is displayed on the display unit 114, the data may be output from the image output unit 109, recorded in the recording medium 112 via the recording medium I/F 110, or transmitted to an external device via the network module 108.

In addition, although all of the pixels of the subject are processed in the processes of steps S1005 to S1009 and then displayed on the display unit 114, the pixels may be processed and displayed pixel by pixel in a raster direction.

Figure 11:
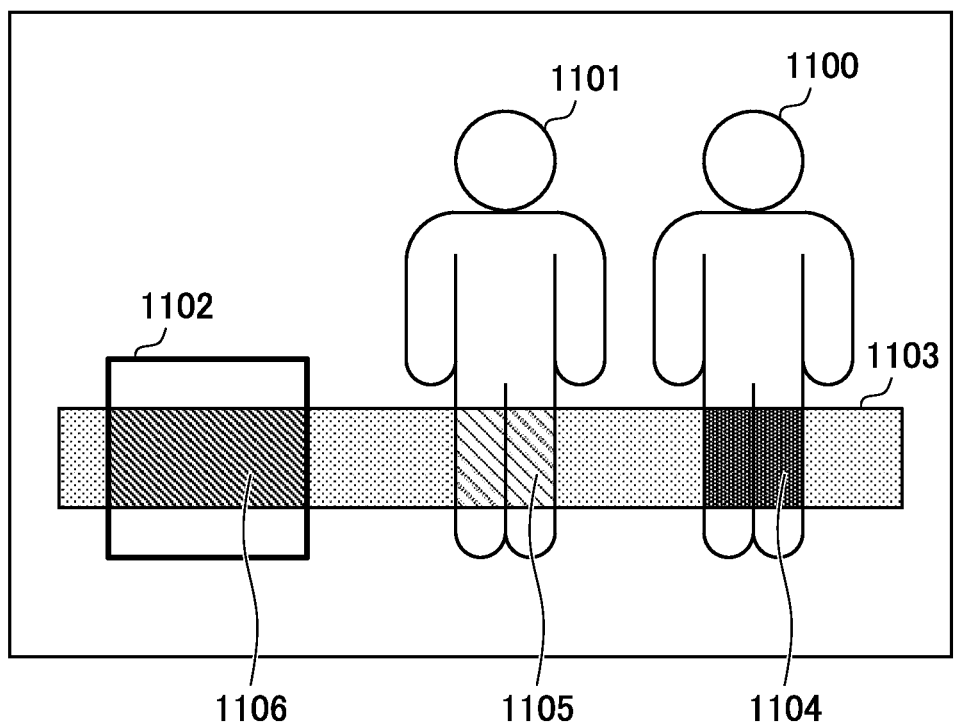
FIG. 11 is a diagram illustrating an example of an image displayed on a display unit 114 when the flowchart of FIG. 10 is performed.

According to the above-described flowchart of FIG. 10, it is possible to perform display, for example, as illustrated in FIG. 11.

Figure 12:
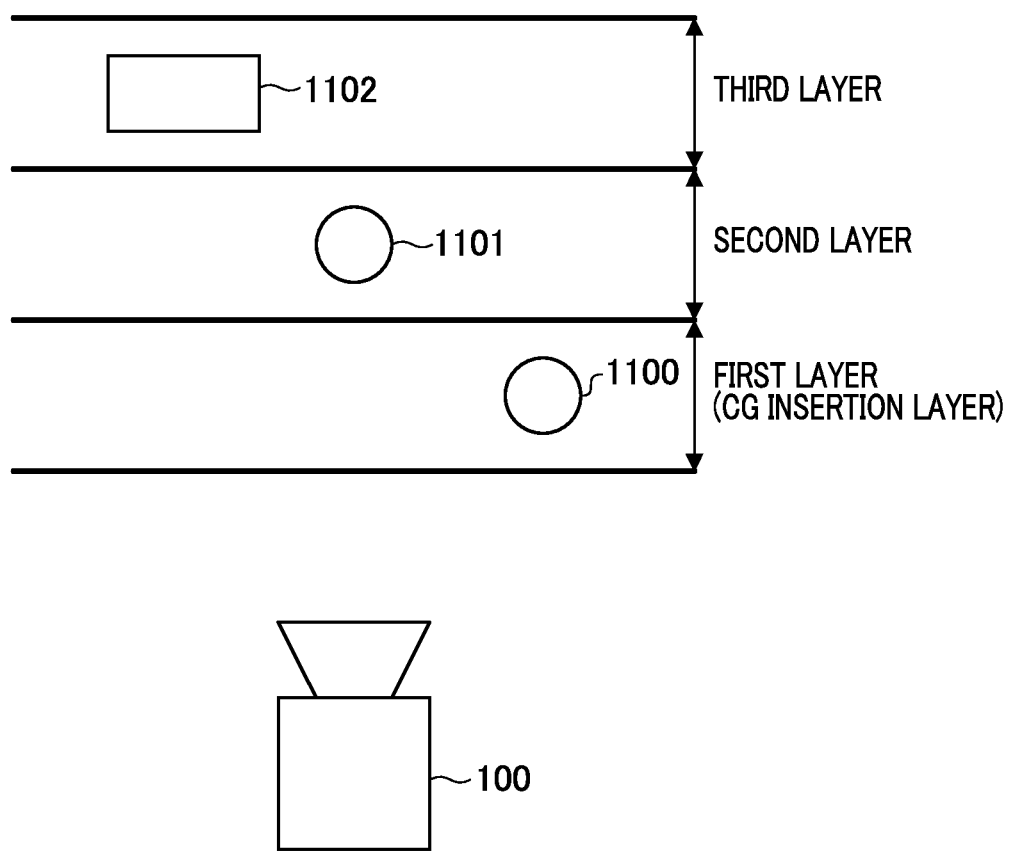
FIG. 12 is a diagram illustrating a positional relationship in a front-rear direction between a subject displayed in FIG. 11 and an image processing device 100.

FIG. 11 is a diagram illustrating an example of an image displayed on the display unit 114 when the flowchart of FIG. 10 is performed. In addition, FIG. 12 is a diagram illustrating a positional relationship between a subject displayed in FIG. 11 and the image processing device 100 in the front-back direction.

In the example of the displayed image illustrated in FIG. 11, subjects 1100 to 1102 and a CG insertion region 1103 calculated from coordinate information are displayed. As illustrated in FIG. 12, regarding a distance from the image processing device 100, the subject 1100, the subject 1101, and the subject 1102 are disposed to become more distant from the image processing device 100 in this order.

Thus, regarding the positions of respective subjects, the subject 1100 is classified as a first layer of the distance layer MAP, the subject 1101 classified as a second layer of the distance layer MAP, and the subject 1102 is classified as a third layer of the distance layer MAP.

FIG. 11 illustrates display in a case where the CG insertion layer is designated as the first layer of the distance layer MAP, and thus a pixel in a portion 1104 where the subject 1100 disposed on the first layer of the distance layer MAP and the CG insertion region 1103 overlap each other is displayed in a warning color.

Regarding a pixel in a portion 1105 where the subject 1101 disposed on the second layer of the distance layer MAP and the CG insertion region 1103 overlap each other, the subject 1101 and the CG insertion layer are close to each other, and thus a background subject is displayed lightly.

On the other hand, regarding a pixel in a portion 1106 where the subject 1102 disposed on the third layer of the distance layer MAP and the CG insertion region 1103 overlap each other, the subject 1102 and the CG insertion layer are far from each other, and thus a background subject is displayed darkly. The other CG insertion regions 1103 are displayed in a CG insertion color.

As described above with reference to FIGS. 9 to 12, according to the present embodiment, it is possible to present a user of a portable terminal in an easy-to-understand manner into which layer of the classified distance layer MAP the CG is to be inserted.

In addition, since a distance layer MAP that is easy to insert CG is generated, the distance layer MAP can be displayed so as to be easily understood by a photographer.

Note that a program for implementing one or more functions in the present embodiment is supplied to a system or a device via a network or a storage medium, and one or more processors in a computer of the system or the device may read out and execute the program. In addition, one or more functions may be implemented by a circuit (for example, an ASIC).

Second Embodiment

Next, processing and procedures in a second embodiment for generating and displaying a distance layer MAP will be described with reference to FIGS. 13 to 24. For convenience of description, differences from the first embodiment will be mainly described, and description of common portions will be omitted.

In the second embodiment, the state of the lens unit 106 will be described on the assumption that, for example, an aperture value is F5.6, a focal length is 50 mm, and a sensitivity ISO value at the time of imaging is 400. In addition, it is assumed that a user has started an operation for setting a distance layer MAP in a state where a subject is 3 m away and is generally in focus.

Here, it is assumed that the user has entered a mode for setting the number of layers and a layer width, similar to the first embodiment.

Figure 13:
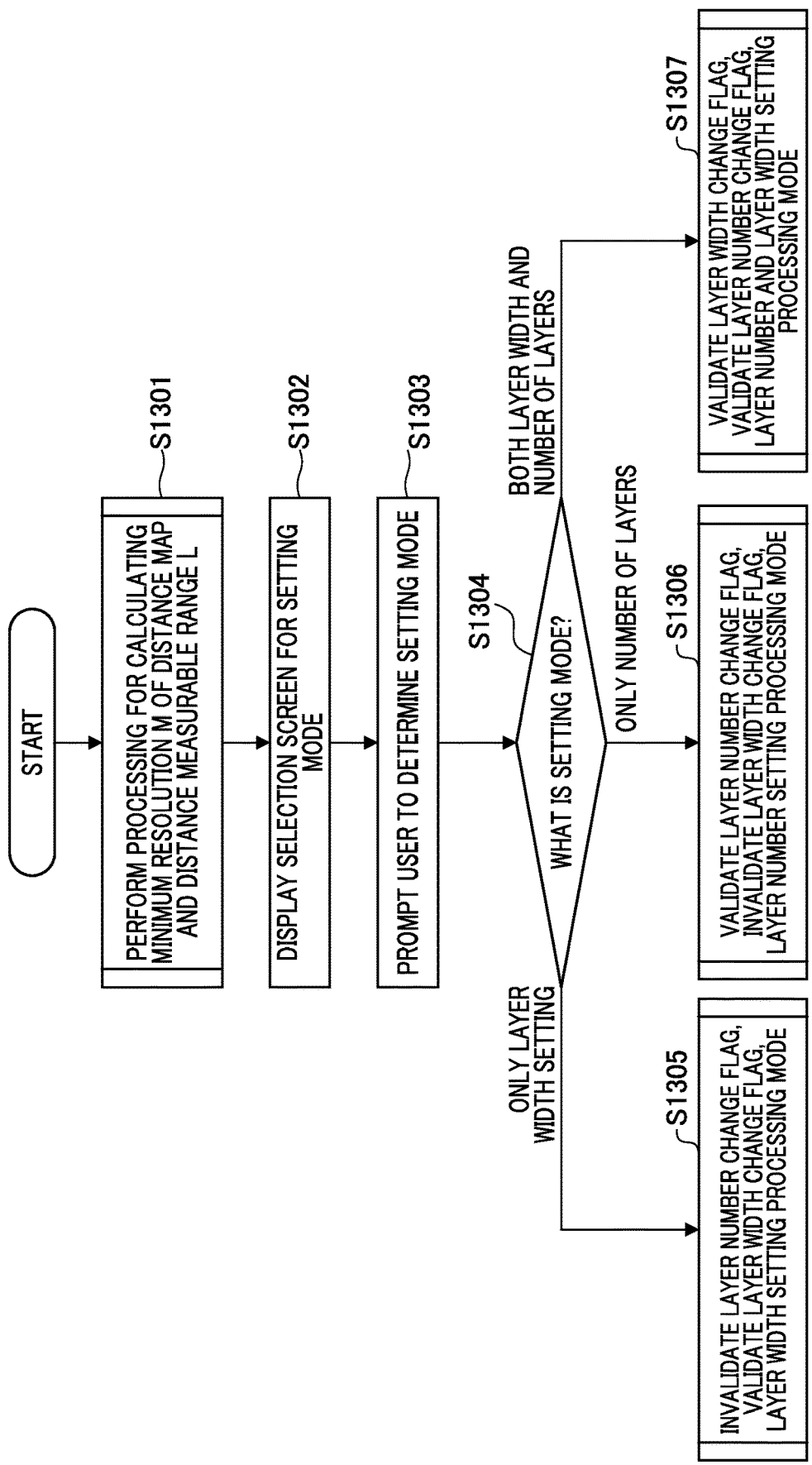
FIG. 13 is a flowchart illustrating processing in a second embodiment.
Figure 14:
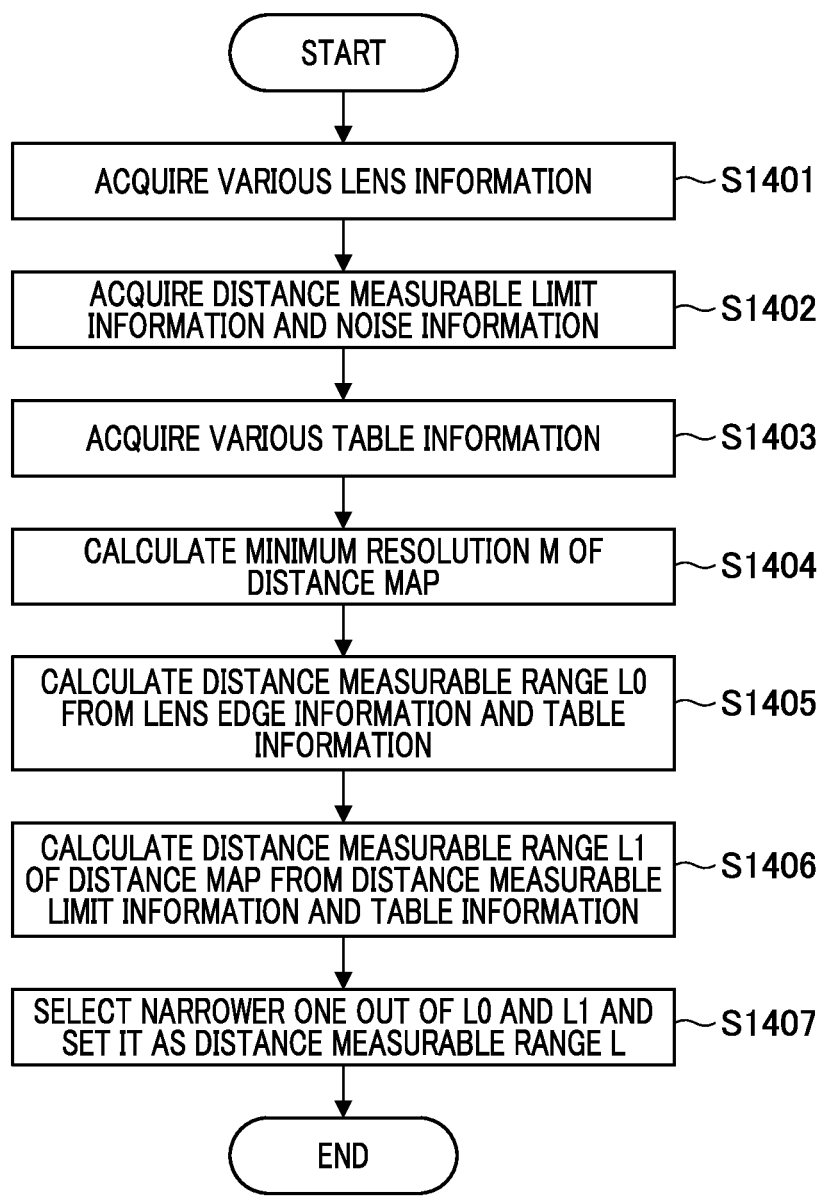
FIG. 14 is a flowchart illustrating a detailed flow of step S1301 in FIG. 13.

FIG. 13 is a flowchart illustrating processing in the second embodiment, and FIG. 14 is a flowchart illustrating a detailed flow of step S1301 in FIG. 13. Note that operations of steps in the flowcharts of FIGS. 13 and 14 are performed by causing a CPU 102 as a computer to execute computer programs stored in a ROM 103 or the like as a storage medium.

In FIG. 13, when the user enters the mode for setting the number of layers and a layer width, and the processing starts, the user enters sub-processing for calculating a minimum resolution width M and a distance measurable range L in a distance layer MAP in step S1301. Here, this sub-processing will be described with reference to the flowchart of FIG. 14.

In step S1401 of FIG. 14, various types of lens information regarding the current lens state of the mounted lens unit 106 as in FIG. 15 are acquired. FIG. 15 is a diagram illustrating a table in which examples of acquired lens information according to the second embodiment are collected.

In FIG. 15, first information (lens information 1) regarding a lens state is an aperture value of a lens (hereinafter referred to as an F value or an F number), and second information (lens information 2) is a focal length of the lens of which the unit is mm. Third information (lens information 3) is positional information (in-focus position) on an image surface at the position of the focus lens, and a difference from a reference position is represented by an mm value.

Here, the position of the focus lens for a subject at infinity is defined as a reference position (0 mm), and it indicates how far the current position of the focus lens is from that reference position. Note that, in the present embodiment, in a case where, for example, the position of the focus lens is 1 mm away from the reference position, it is assumed that the lens is focused on a subject at a distance of 3 m. However, this depends on the focal length and the like of the lens and also changes depending on a zoom position.

Fourth information (lens information 3) regarding the lens state is the distance of the subject focused at the focus position of the focus lens, and the subject distance is acquired in m units. This can be calculated based on optical design information of the lens and is stored in the image processing device 100 as a design value. Note that, as described above, in the present embodiment, for example, a numerical value of 3 m is obtained.

Fifth information (lens information 5) is relative image surface movement amount information from the current position of the focus lens to the infinite end or close end of the focus lens.

For example, when the subject distance is 3 m, the information is data in units of mm with a sign, such as −1 mm to the infinite end and +9 mm to the close end. These pieces of information will be hereinafter referred to as infinite defocus information and close defocus information, respectively. Note that, a movement range of an image surface focus in the lens state is 10 mm from the infinite end of the lens to the close end.

When these pieces of lens information are acquired, distance measurable limit information and noise information are acquired in step S1402. The distance measurable limit information is an index indicating to what extent an image deviation amount (shift amount) can be detected as detection limit performance based on image surface phase difference technology.

In the image surface phase difference technology, a shift amount during a correlation operation may be changed depending on system conditions, and an image deviation of 10 shifts or more cannot be detected in a case where correlation operation processing is performed only with a shift amount of up to 20 shifts, and thus such an index is generated and stored.

In addition, the noise information is parameter information that greatly affects a noise level. Here, for example, the noise information is an ISO setting value which is a sensitivity setting of a sensor. In step S1403, various table information as illustrated in FIG. 16 is obtained.

FIGS. 16(A) and 16(B) are diagrams illustrating examples of tables acquired in step S1403. FIG. 16(A) is a diagram in which an F value is shown in a left column, and a resolution on an image surface of a focus lens corresponding to the F value in the left column is shown in a right column in units of mm. FIG. 16(B) is a diagram in which an ISO value is shown in a left column, and the degree of influence on a resolution on an image surface of a focus lens for the ISO value in the left column is shown in a right column in units of mm.

Returning to FIG. 14, in the next step S1404, a minimum resolution width M of a subject distance in a distance layer MAP is calculated using the lens information in FIG. 15 and table information in FIG. 16. Here, description is given on the assumption that an F value is 5.6, and an ISO value is 400.

First, referring to the value of F5.6 in the table of FIG. 16(A), the image surface resolution is 0.025 mm. In addition, referring to the value of ISO 400 from the table of FIG. 16(B), a noise component is 0.002 mm. Using these, a minimum resolution that can be calculated from a focus lens focus on an image surface can be calculated as 0.025+0.002=0.027 mm.

Further, by converting this image surface information into a subject distance, a minimum resolution width M converted into a subject distance is calculated. The minimum resolution of 0.027 mm on the image surface is approximately 30 cm when converted into a distance from a subject position of 3 m and a lens state with a focal length of 50 mm.

That is, under this lens condition, positioning is performed such that a focus positional deviation on the image surface of 0.027 mm is set to be a minimum resolution, is a focus position shift of 0.027 mm on the image surface, and the minimum resolution width M converted into the subject distance is detectable as 30 cm.

Figure 17:
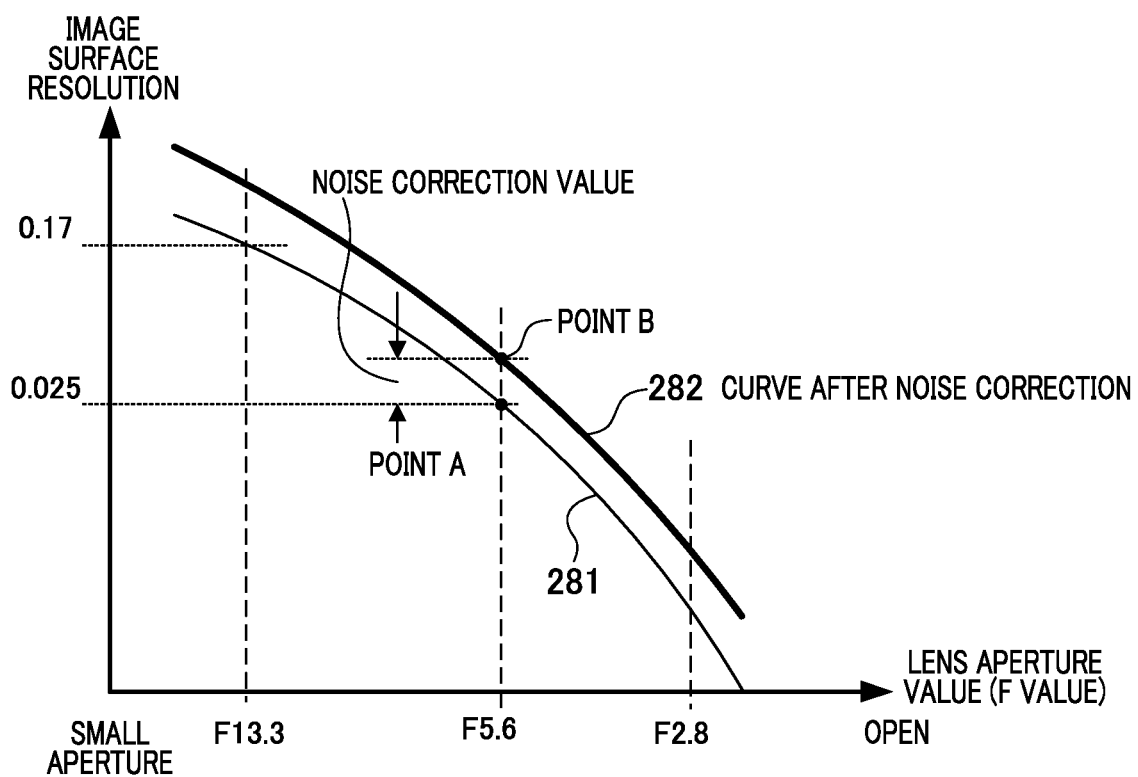
FIG. 17 is a graph illustrating the resolution of an image surface in the second embodiment.

Note that the minimum resolution width M of the subject distance calculated here is an approximate value, and may be, for example, in units of 10 cm. Further, a supplementary description of the calculation of the minimum resolution width M will be given using a graph of FIG. 17. FIG. 17 is a graph showing a resolution of an image surface in the second embodiment, in which the horizontal axis represents an aperture value of a lens (the right side is an aperture open side having a lower value), and the vertical axis represents an image surface resolution.

Reference numeral 281 denotes a curve plotting data in the table of FIG. 16. For example, a resolution at an intersection A with an auxiliary line of F5.6 is 0.025 as shown in the table.

In addition, when noise correction is performed based on noise information corresponding to ISO setting in FIG. 16(B), a point B is obtained, and a curve connecting this in an F value direction is 282, which is a curve of an image surface resolution after the noise correction in the case of ISO 400. That is, a resolution at the point B is 0.027 mm.

Returning to the flowchart of FIG. 14, in the next step S1405, a distance measurable range L0 is calculated from lens edge information and table information.

That is, regarding defocus information of each of an infinite end and a close end at the current position of a focus lens, the infinite end is 1 mm on an image surface, and the close end is 9 mm. Thus, the position of the image surface of each of the ends is converted into a subject distance, and the range thereof is calculated as a distance measurable range L0. The conversion from the position of the image surface into the distance is calculated by the CPU 102 as described above.

In the next step S1406, a distance measurable range L1 of a distance layer MAP is calculated from distance measurable limit information and table information. Here, the distance measurable limit information is acquired as a correlation operation shift amount 20, and the distance measurable range L1 is calculated as 20×0.025=0.5 mm using a coefficient that is converted into a defocus after a correlation operation (the coefficient is 0.025 under the conditions of the present embodiment).

On the other hand, when a large defocus state is set, signal quality on the image surface deteriorates, and thus there is a detection limit, and a limit value due to a defocus value is used as second distance measurable limit information and needs to be further corrected in L1 calculation.

In addition, as a subject distance increases, the amount of fluctuation on the image surface becomes smaller even when the subjects moves by 50 cm, and it is not possible to distinguish whether the fluctuation is caused by noise or by the actual change in the subject distance. Thus, it is also required to add noise information.

From this, it is possible to actually perform defocus detection within a range of ±0.5 mm when the image surface has edges of 1 mm on the infinity side and 9 mm on the close side from the lens edge information. In this manner, a resolution changes due to restrictions on a mechanical end of the lens, restrictions on noise, and the like.

When the range of ±0.5 mm on this image surface is converted into a distance, the range of approximately 1.7 m to 8 m is a distance measurable range L1. The subsequent description will be continued using the range of L1. The above-described range of L0 is a distance measurable range due to lens restrictions, L1 is a distance measurable range due to correlation operation performance restrictions, and a smaller one of them is a distance measurable range L for the image processing device 100.

For this reason, in the next step S1407, comparison processing is performed, and a narrower one out of L0 and L1 is selected as a distance measurable range L. Note that, when distance conversion is performed at an infinite distance and a close distance, calculation is performed on each of a far side and a close side. Here, the range L1 is obviously narrower, and both the infinity and close distances are within this range, and thus the distance measurable range L is also determined as a range of 6.3 m between 1.7 m and 8 m.

As described above, in the flow of FIG. 14, sub-processing (step S1301) of calculating the minimum resolution width M converted into a subject distance and the distance measurable range L is performed, and layer information for each distance is generated based on lens information and distance information of a lens unit. Here, the lens information includes at least one of a focal length, an in-focus position, and aperture information.

Returning to FIG. 13, in the next step S1302, a setting mode selection screen for the user is displayed on, for example, the display unit 114. Subsequently, in step S1303, an operator (user) of the image processing device 100 is prompted to select whether to set the number of layers of a distance map, whether to set a layer width, or whether to set both.

Here, steps S1302 and S1303 function as setting steps (setting units) for setting layer information. Note that, in steps S1302 and S1303 as setting units, it is only required that at least one of the number of layers and the width of a layer in a subject distance direction can be set as layer information for each distance.

Figure 18A:
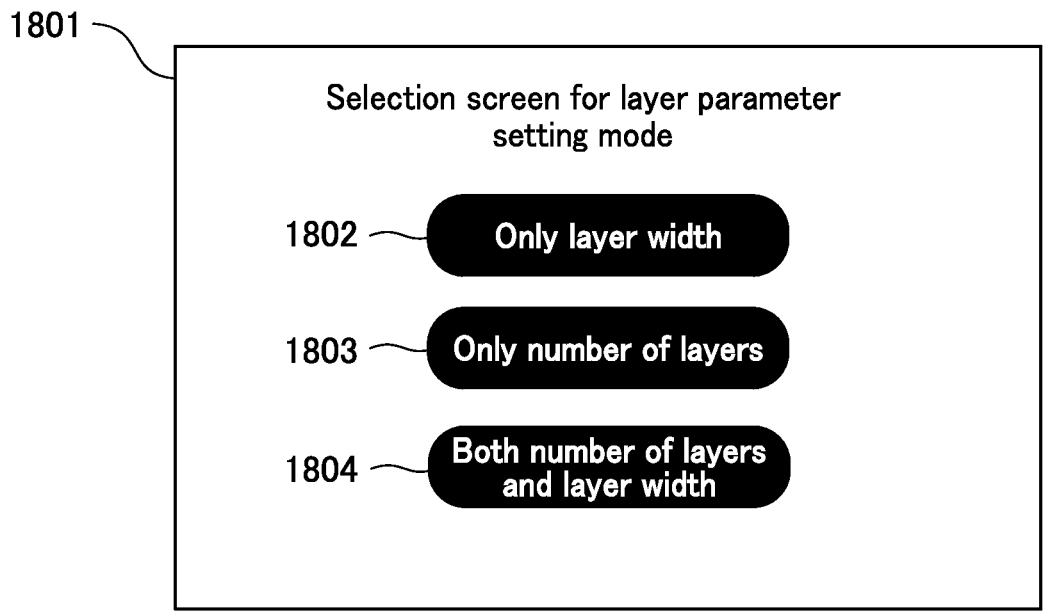
FIG. 18(A) is a diagram illustrating an example of a selection screen for a layer parameter setting mode in the second embodiment.

A display example in this case is illustrated in FIG. 18. FIG. 18(A) is a diagram illustrating an example of a selection screen for a layer parameter setting mode in the second embodiment. In FIG. 18(A), reference numeral 1801 denotes the entire menu screen, and reference numerals 1802 to 1804 denote options.

Figure 18B:
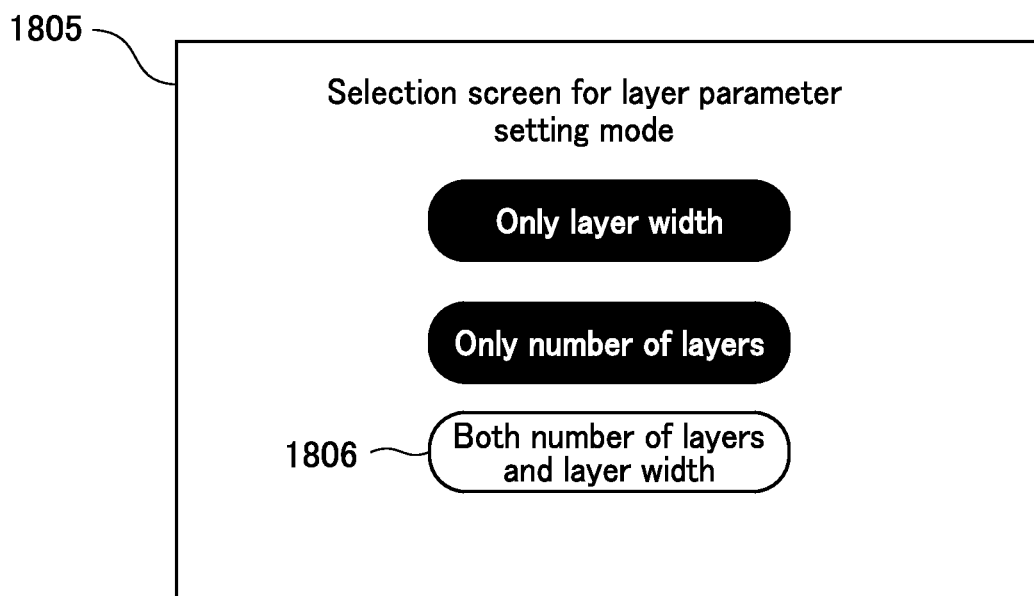
FIG. 18(B) is a diagram illustrating a menu screen in which the state of FIG. 18(A) has transitioned to a state where both the number of layers and the width of a layer are selected.

In addition, FIG. 18(B) is a diagram illustrating a menu screen in which the state of FIG. 18(A) has transitioned to a state where both the number of layers and a layer width are selected. A menu screen 1805 shows a state where both the number of layers and a layer width are selected, and the option denoted by 1804 is displayed in a black-and-white reversed manner as denoted by 1806.

Returning to FIG. 13, in step S1303, as described above, the setting mode selection screen is displayed for the user, and when the user selects the setting mode on the menu screen, the set setting mode is determined in the next step S1304.

Further, in a case where a layer width setting mode for setting only a layer width is selected, in a case where a layer number setting mode for setting the number of layers is selected, and in a case where a layer number and layer width setting mode for setting both is selected, the processing proceeds to respective steps S1305 to S1307. In addition, processing for validating a layer number change flag and a layer width change flag corresponding to each of the steps is performed and proceeds to each of setting processing modes.

Figure 19:
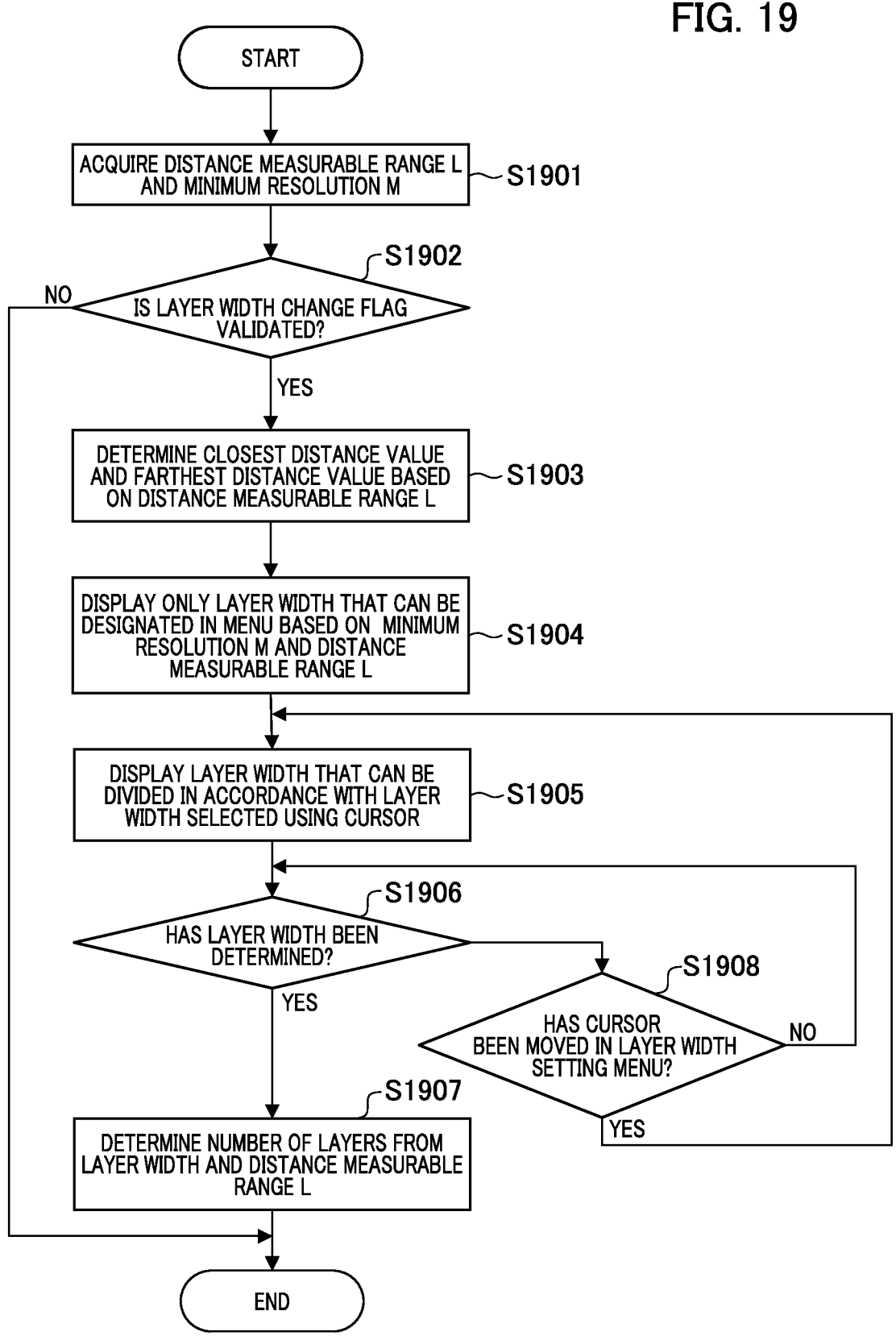
FIG. 19 is a flowchart illustrating layer width setting processing in step S1305 of FIG. 13 in detail.

Each of the setting processing modes will be described in more detail with reference to flowcharts of FIGS. 19 to 23. First, in a case where the layer width setting mode for setting only a layer width is selected, the processing proceeds to step S1305 of FIG. 13. FIG. 19 is a flowchart illustrating layer width setting processing in step S1305 of FIG. 13 in detail. In addition, FIGS. 20(A) to 20(F) are diagrams illustrating examples of display in the layer width setting mode.

In FIG. 19, when the layer width setting mode is set, the above-described distance measurable range L and minimum resolution width M of the subject distance are acquired in step S1901. In the next step S1902, it is determined whether or not the layer width change flag is validated (On), and in a case where the layer width change flag is not validated, the flow of FIG. 19 is terminated.

When the layer width setting mode is set in step S1305, the layer width change flag should be validated (On). Thus, a case where layer width change processing is performed and the flag is not validated results in error processing. Since the layer width change flag is validated (On) in a normal state, the processing proceeds to the next step S1903.

In step S1903, a farthest distance value and a closest distance value at the time of displaying a menu are determined based on the distance measurable range L. In the next step S1904, only a layer width that can be designated is displayed in the menu based on the minimum resolution width M of the subject distance and the distance measurable range L.

That is, a layer width for menu display is calculated using the minimum resolution width M of the subject distance, and the menu display is performed based on calculation results. In the case of the distance measurable range L and the minimum resolution width M, L/M is calculated, and thus a width when the layer width is set to be the minimum resolution width M is the layer width for performing the menu display. In addition, a layer width which is larger than the minimum resolution width M and smaller than the distance measurable range L is a display candidate.

In this manner, step S1904 functions as a step of setting a layer width as a reference for generating layer information and switching setting value display (layer width display) that can be set in accordance with lens information of a lens unit.

On the other hand, there is a display limit on the menu screen, and there are a maximum of 20 candidates. In addition, a minimum unit for pitching a layer width is set to 10 cm here, and thus, for example, when it is assumed that the minimum resolution width M is 30 cm and a step is 10 cm, candidates for the layer width can be calculated up to 30 cm, 40 cm, 50 cm, . . . , 310 cm.

Note that the maximum value of 310 cm is half the maximum value of the distance measurable range L, and the number of layers is assumed to be 2. However, a maximum number on the menu is 20, and when the maximum number exceeds 20, a display target is limited in ascending order of a layer width.

That is, the number of candidates is 20 from 30 cm to 20 in units of 10 cm. In this manner, it is possible to calculate candidates for the layer width at the time of creating a distance layer MAP. Although a maximum layer width is obtained when M=L, separation is meaningless, and thus a minimum number of layers to be calculated is assumed to be 2. Note that the minimum number of layers may be 3, and the layer width may be the distance measurable range L/3. This is to insert a synthesized image before and after an in-focus position.

Figure 20A:
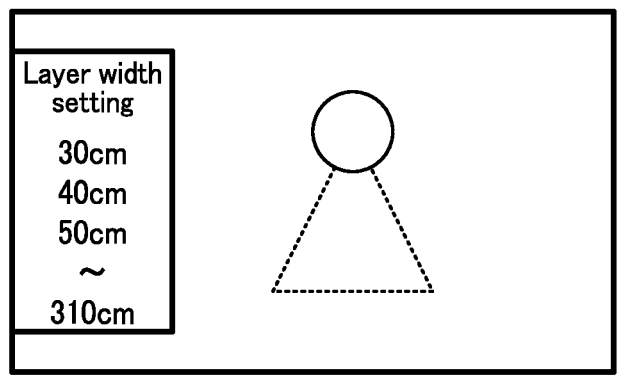
FIGS. 20(A) to 20(F) are diagrams illustrating examples of display in a layer width setting mode.

A display state in this case is illustrated in FIG. 20(A). In FIG. 20(A), a layer width setting menu is displayed on the left side of a screen, and options for layer width setting are displayed. Note that all candidates can be selected by scroll display. A person as a subject being imaged is displayed in the vicinity of the center of the screen.

Figure 20B:
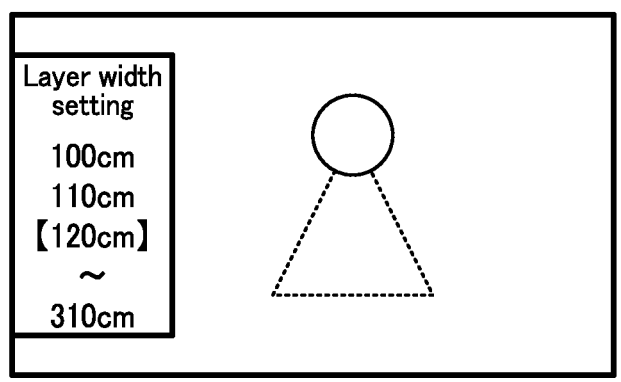
Figure 20C:
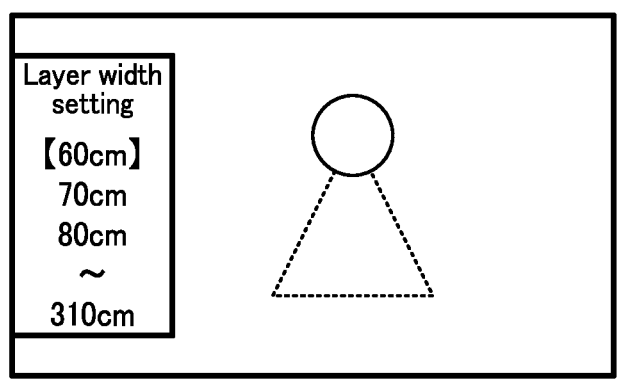
Figure 20D:
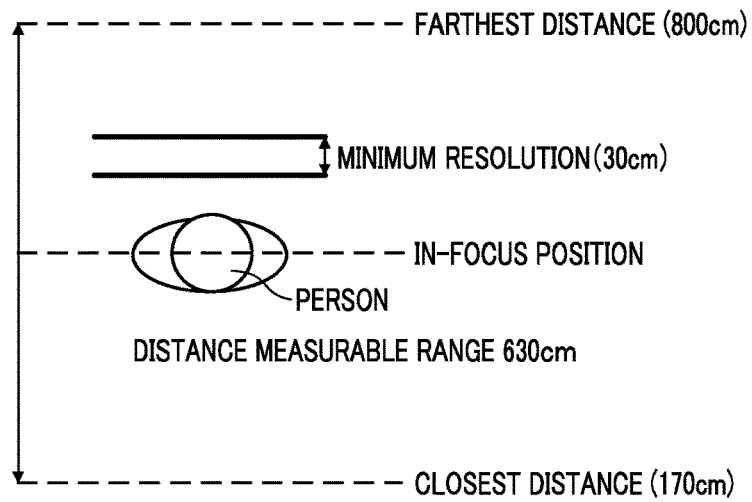

FIG. 20(D) is a diagram illustrating an example of display in a case where display is switched immediately after the layer width setting menu is displayed, and a depth direction at this time is schematically illustrated. As an imagable range, a closest distance of 170 cm and a farthest distance of 800 cm are displayed, and a minimum resolution of 30 cm and a subject at an in-focus position are simply displayed.

In FIGS. 20(A) and 20(D), the display is also switched by switching performed by the operation unit 113. With such a menu display, processing for switching display is performed using a layer width selected by the user. In the next step S1905, a layer width which is set by moving a cursor is detected on the displayed menu. In addition, a layer width that can be divided in accordance with the set layer width is displayed.

Figure 20E:
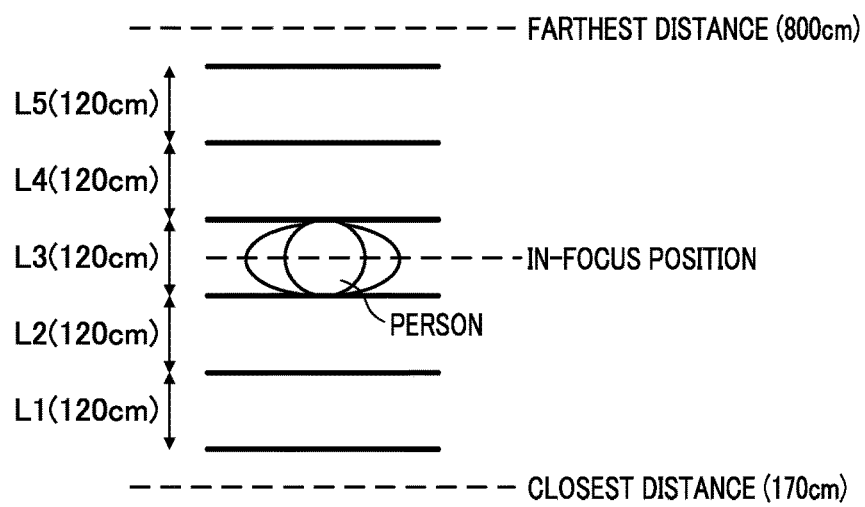
Figure 20F:
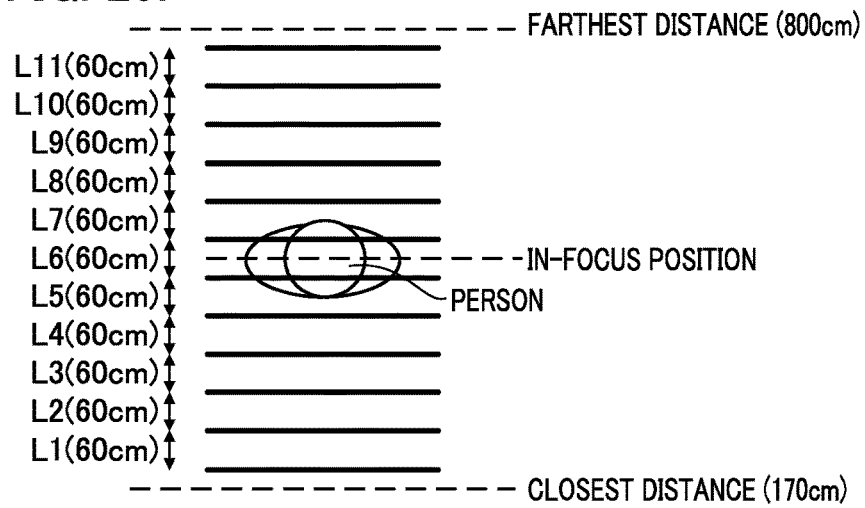

For example, when a width of 120 cm is set as illustrated in FIG. 20(B), the location of a main subject in a layer is displayed as illustrated in FIG. 20(E), and how to perform layer separation for a closest distance of 170 cm and a farthest distance of 800 cm is displayed in an easy-to-understand manner. In addition, FIG. 20(C) is a diagram illustrating a state in a case where layer width setting is selected as 60 cm. A layer width divided in accordance with the layer width of 60 cm set in FIG. 20(F) is displayed.

In step S1906, a layer width menu is selected in step S1905, and it is determined whether or not a layer width determination operation has been performed. In the case of No, the processing proceeds to step S1908 to check whether or not the cursor has been moved by the user in the layer width setting menu.

In a case where the cursor has been moved, and the layer width has been changed, the processing returns to step S1905, and the layer width setting menu is displayed again in the selected layer width as described above. In a case where the cursor has not been moved, the processing waits for the input of the layer width determination operation in step S1906. When it is determined in step S1906 that the layer width determination operation has been performed, the processing proceeds to step S1907 to determine a layer width and the number of layers, and the flow of FIG. 19 is terminated.

Figure 21:
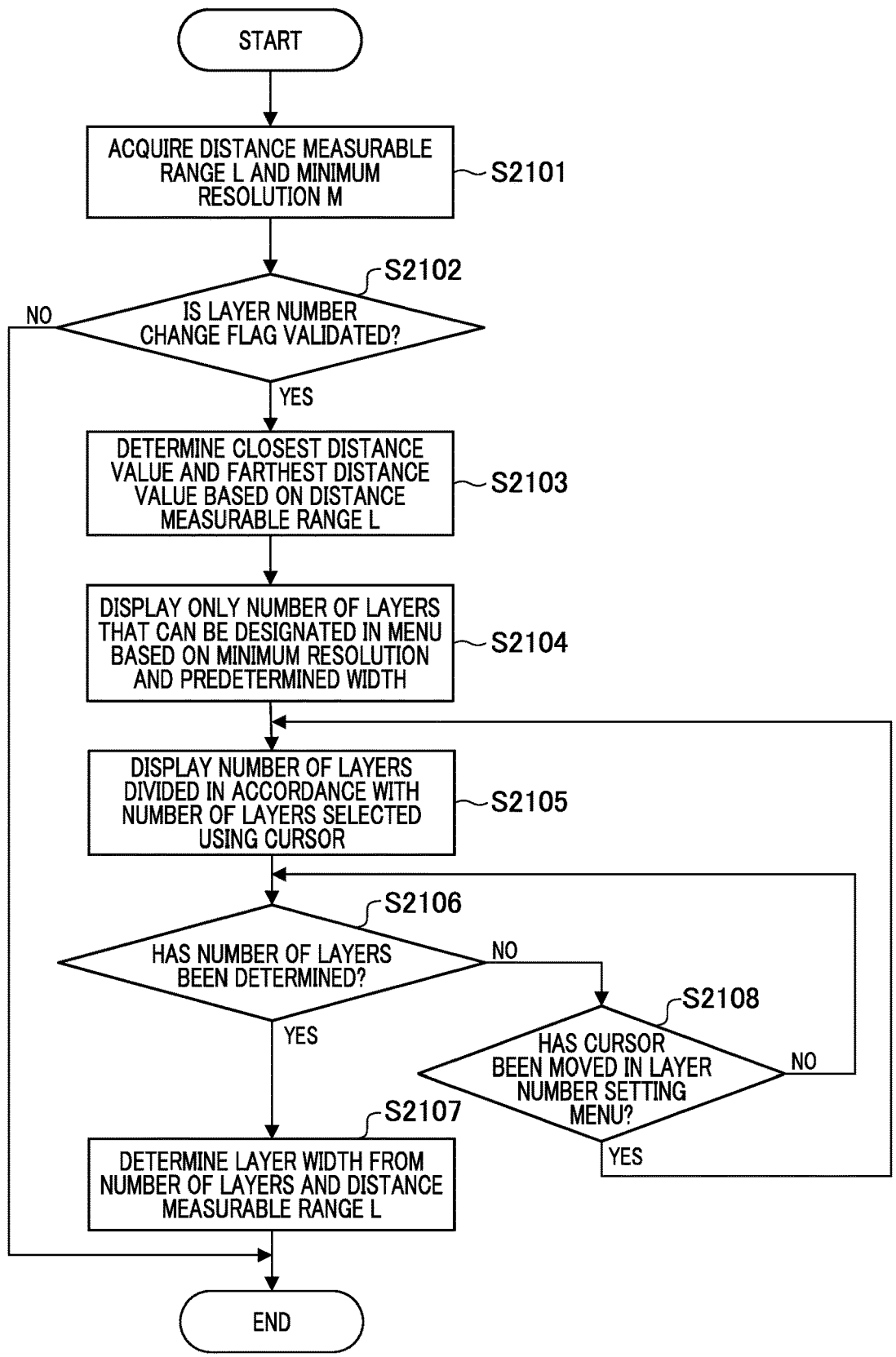
FIG. 21 is a flowchart illustrating layer number setting processing in step S1306 of FIG. 13 in detail.

Next, in step S1304 of FIG. 13, in a case where the layer number setting mode for selecting only the number of layers is selected, the processing proceeds to step S1306 of FIG. 13 to perform layer number setting processing. FIG. 21 is a flowchart illustrating the layer number setting processing in step S1306 of FIG. 13 in detail, and FIGS. 22(A) to 22(F) are diagrams illustrating examples of display in the layer number setting processing.

When a layer number setting processing mode is set, the flow of FIG. 21 is started, and the above-described distance measurable range L and minimum resolution width M of the subject distance are acquired in step S2101. In the next step S2102, it is determined whether the layer number change flag is validated (On), and in the case of No, the flow of FIG. 21 is terminated.

When the layer number setting mode is set in step S1306, the layer number change flag should be validated (On). Thus, a case where layer number change processing is performed and the flag is not validated results in error processing. Since the layer number change flag is validated (On) in a normal state, the processing proceeds to step S2103, and farthest and closest distance values at the time of displaying the menu based on the distance measurable range L are determined.

In the next step S2104, the number of layers for displaying the menu is calculated based on the distance measurable range L and the minimum resolution width M of the subject distance, and only the number of layers that can be designated is displayed in the menu based on calculation results. Regarding the calculation of the number of layers, in the case of the distance measurable range L and the minimum resolution width M, a maximum value of the number of layers can be calculated by calculating L/M. Here, L/M is 670 cm/30 cm, and a maximum of 22 layers are obtained.

In addition, a minimum value of the number of layers may be two. Note that there is a display limit on the menu screen, and there are a maximum of 20 candidates. Due to such restrictions, it is assumed that a display target is limited in ascending order of the number of layers. That is, the candidates are 2-layers, 3-layers, 4-layers, . . . , 21-layers.

Figure 22A:
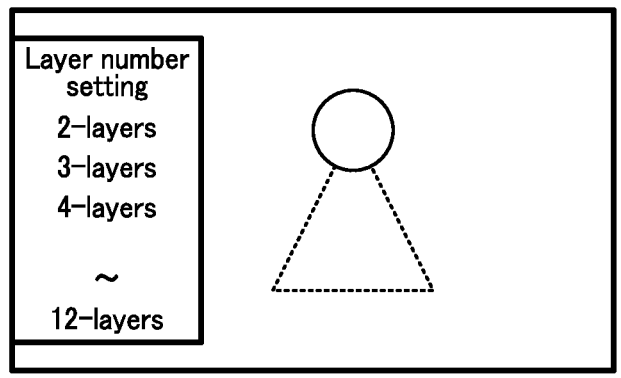
FIGS. 22(A) to 22(F) are diagrams illustrating examples of display in a layer number setting mode.

In this manner, candidates for the number of layers at the time of creating a distance layer MAP are calculated. A display state in this case is illustrated in FIG. 22(A). In FIG. 22(A), a menu for setting the number of layers is displayed on the left side of the screen, and options for layer number setting are displayed. Note that all candidates can be selected by scroll display. FIG. 22(A) is the same as FIG. 20 in the other respects, and thus description thereof will be omitted.

In this manner, step S2104 functions as a step of setting a layer number as a reference for generating layer information and switching setting value display (layer number display) that can be set in accordance with lens information of a lens unit.

Figure 22B:
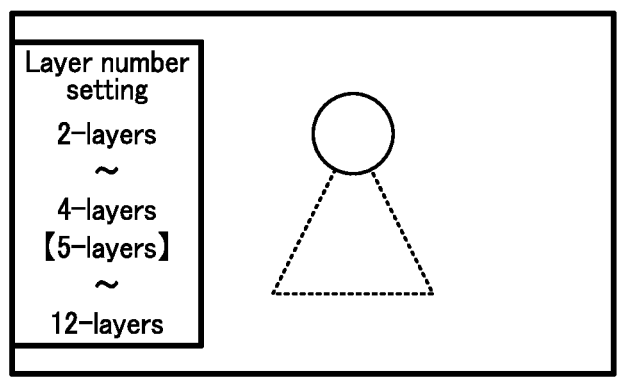
Figure 22C:
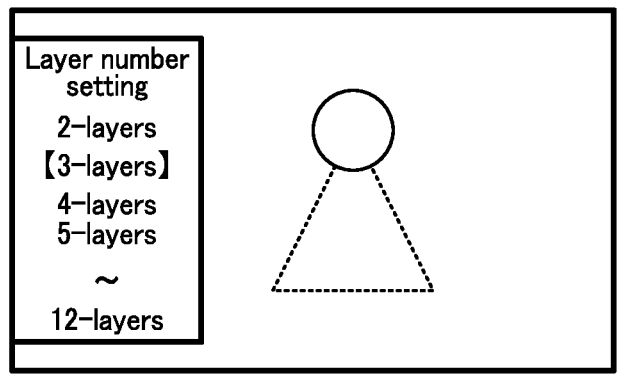
Figure 22D:
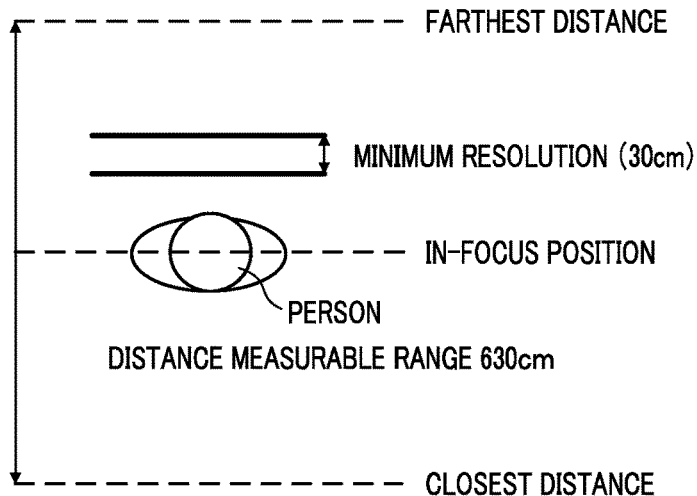

FIG. 22(D) is a diagram illustrating display immediately after the menu for setting the number of layers is displayed, and schematically illustrating a depth direction at this time. As an imagable range, a closest distance of 170 cm and a farthest distance of 800 cm are displayed, and a minimum resolution of 30 cm and a subject at an in-focus position are simply displayed.

In FIGS. 22(A) and 22(D), the display is also switched by operation performed by the operation unit 113. With such a menu display, processing for switching display is performed using the number of layers selected by the user. In the next step S2105, the number of layers which is set in association with the operation of a cursor is detected on the displayed menu. In addition, the number of layers divided in accordance with the set number of layers is displayed.

Figure 22E:
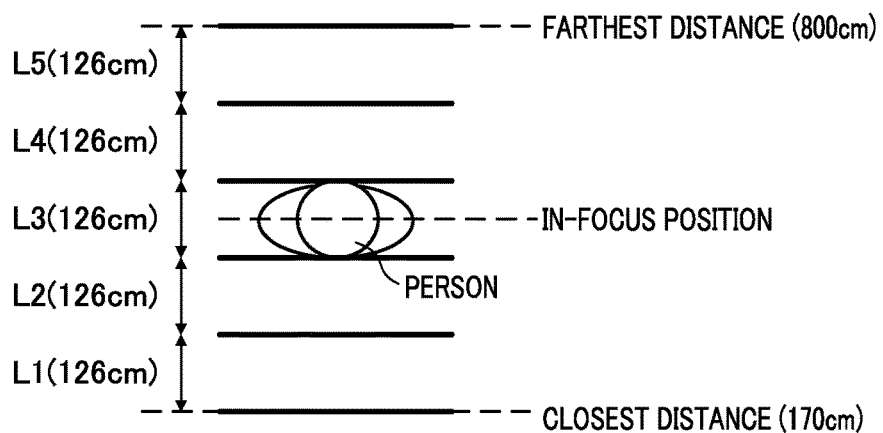

For example, when the setting is made to 5-layers as illustrated in FIG. 22(B), the location of a main subject in a layer is displayed as illustrated in FIG. 22(E), and how to perform layer separation for a closest distance of 170 cm and a farthest distance of 800 cm is displayed in an easy-to-understand manner.

Figure 22F:
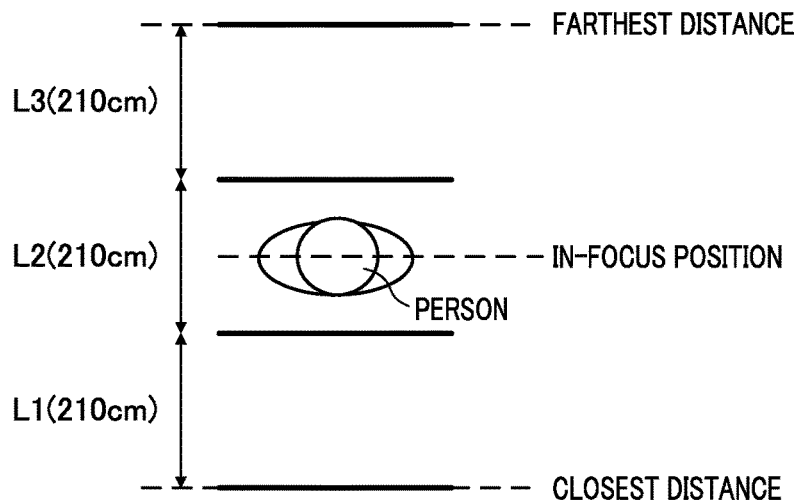

In addition, FIGS. 22(C) and 22(F) are diagrams illustrating a state where the setting of the number of layers is selected as three.

In the next step S2106, the number of layers is selected from the menu in step S2105, and it is determined whether or not a layer number determination operation has been performed. In the case of No, the processing proceeds to step S2108, and the user checks whether or not the cursor has been moved in the layer number setting menu.

In a case where the cursor has been moved and the number of layers has been changed, the processing returns to step S2105, and the layer number setting menu is displayed again in the selected number of layers as described above. Further, in a case where the cursor has not been moved, the processing waits for the input of the layer number determination operation in step S2106.

When it is determined in step S2106 that the layer number determination operation has been performed, the processing proceeds to the next step S2107 to calculate a layer width from the determined number of layers and the distance measurable range L, and the flow of FIG. 21 is terminated.

Figure 23:
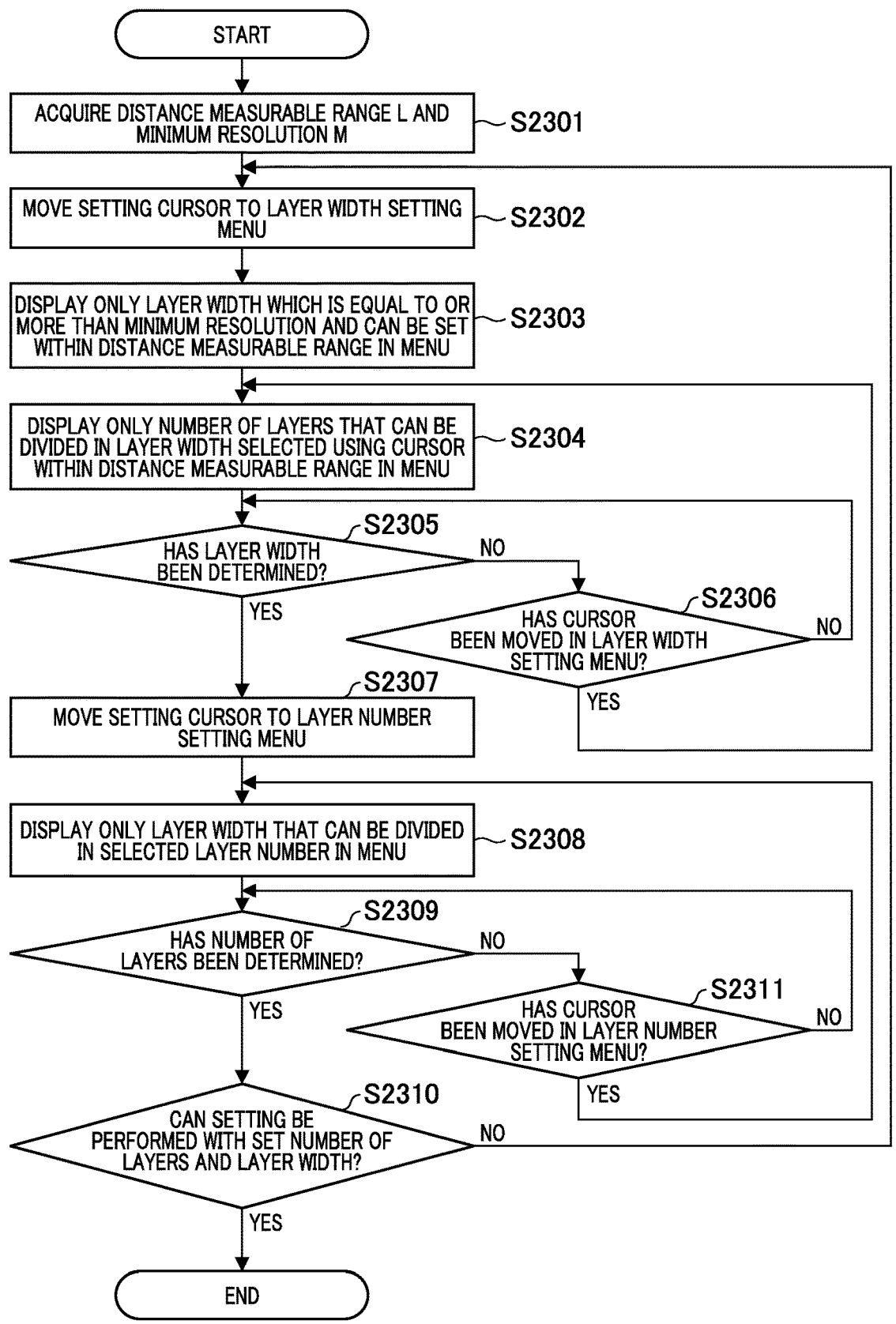
FIG. 23 is a flowchart illustrating layer number and layer width setting processing in step S1307 of FIG. 13 in detail.

Finally, a case where both a layer width and the number of layers are selected will be described. In the case of a layer number and layer width setting processing mode, the processing proceeds to step S1307 in FIG. 13 to perform the layer number and layer width setting processing. FIG. 23 is a flowchart illustrating layer number and layer width setting processing in step S1307 of FIG. 13 in detail, and FIGS. 24(A) to 24(E) are diagrams illustrating examples of display in a layer number and layer width setting mode.

When the layer number and layer width setting processing mode is set, the flow of FIG. 23 is started, and the above-described distance measurable range L and minimum resolution width M are acquired in step S2301. In the next step S2302, first, the layer width setting menu is validated, and a cursor for setting is also moved to the layer width setting menu to select a layer width.

In the next step S2303, farthest and closest distance values at the time of displaying the menu based on the distance measurable range L are determined. Further, the number of layers for displaying the menu is calculated using the distance measurable range L and the minimum resolution width M, and only a layer width which is equal to or more than the minimum resolution and can be set within the distance measurable range is displayed in the menu.

Regarding the calculation of the number of layers, in the case of the distance measurable range L and the minimum resolution width M, a maximum value of the number of layers can be calculated by calculating L/M. Here, L/M is 670 cm/30 cm, and a maximum of 22 layers are obtained. In addition, a minimum value of the number of layers may be two.

Note that there is a display limit on the menu screen, and there are a maximum of 20 candidates. Due to such restrictions, it is assumed that a display target is limited in ascending order of the number of layers. That is, the candidates are 2-layers, 3-layers, 4-layers, . . . , 21-layers.

In this manner, candidates for the number of layers at the time of creating a distance layer MAP are calculated. Further, regarding the calculation of a layer width, a layer width at the time of setting the minimum resolution width M is calculated by calculating L/M using the distance measurable range L and the minimum resolution width M. A width larger than the minimum resolution width M and smaller than the distance measurable range L is a candidate.

On the other hand, there is a display limit on the menu screen, and there are a maximum of 20 candidates. In addition, a minimum unit for pitching a layer width is set to 10 cm here, and thus, for example, when it is assumed that the minimum resolution width M is 30 cm and a step is 10 cm, candidates for the layer width at that time can be calculated up to 30 cm, 40 cm, 50 cm, . . . , 310 cm.

Note that the maximum value of 310 cm is half the maximum value of the distance measurable range L, and the number of layers is assumed to be 2. However, a maximum number on the menu is 20, and when the maximum number exceeds 20, a display target is limited in ascending order of a layer width. That is, the number of candidates is 20 from 30 cm in units of 10 cm.

Figure 24A:
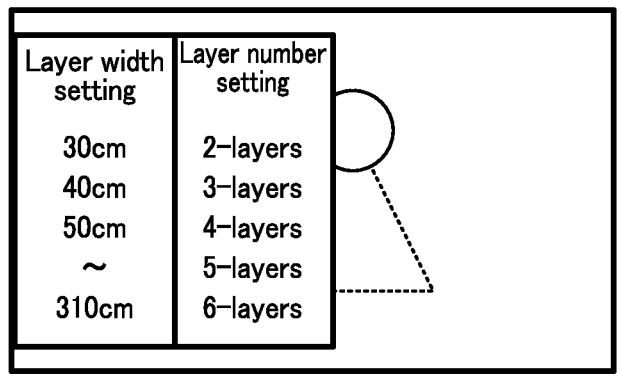
FIGS. 24(A) to 24(E) are diagrams illustrating examples of display in a layer number and layer width setting mode.

In this manner, it is possible to calculate candidates for the layer width at the time of creating a distance layer MAP. Although a maximum layer width is obtained when M=L, separation is meaningless, and thus a minimum number of layers to be calculated is assumed to be 2. A menu display state at this time is illustrated in FIG. 24(A). Both layer number setting and layer width setting are displayed side by side in the menu on the left side of the screen, and options of each of them are displayed. Note that all candidates can be selected by scroll display.

Figure 24B:
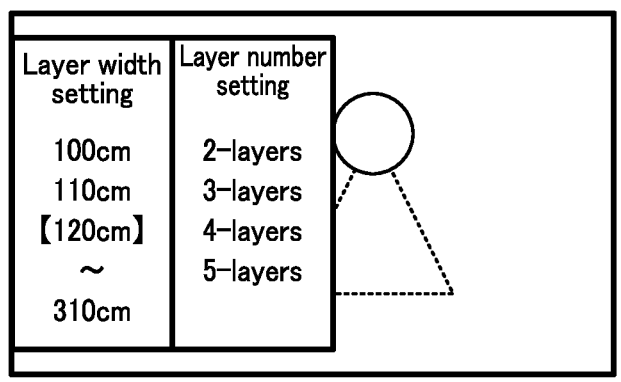
Figure 24C:
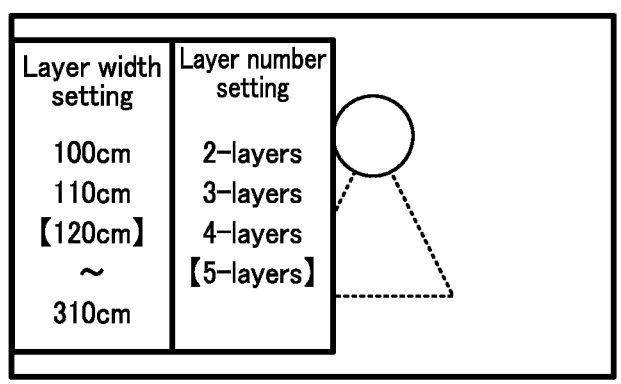
Figure 24D:
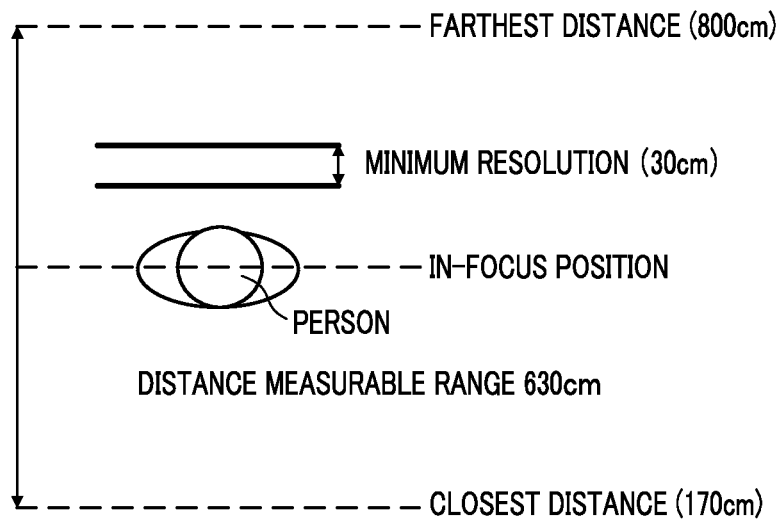

FIG. 24(D) is a diagram illustrating display immediately after a menu is displayed, and schematically illustrating a depth direction at this time. As an imagable range, a closest distance of 170 cm and a farthest distance of 800 cm are displayed, and a minimum resolution of 30 cm and a subject at an in-focus position are simply displayed.

In FIGS. 24(A) and 24(D), the display is also switched by operation performed by the operation unit 113. With such a menu display, processing for switching display is performed using the layer width and the number of layers selected by the user.

In the next step S2304, only the number of layers that can be divided in the layer width is displayed in the layer number setting menu by using the layer width selected here. Here, a valid number of layers is displayed as bold black characters, while an invalid number of layers is not displayed or displayed in gray.

FIG. 24(B) illustrates a state where only a layer width is selected. When 120 cm is selected, a menu for the number of layers of six or more is not displayed or displayed as gray characters. In the next step S2305, a layer width is selected in the menu, and it is determined whether or not a layer width determination operation has been performed.

In the case of No, the processing proceeds to step S2306 to check whether or not the cursor has been moved by the user in the layer width setting menu. In the case of Yes, it is determined that the layer width has been changed, and the processing returns to step S2304 to display the layer number menu again in the selected layer width as described above.

In a case where the cursor has not been moved, and the layer width has not been changed, the processing waits for the input of a layer width determination operation in step S2305. When it is determined in step S2305 that the layer width determination operation has been performed, the processing proceeds to step S2307 to move a setting cursor to the layer number setting menu and set a state where the number of layers can be selected.

When the number of layers is selected in the next step S2308, only a layer width that can be divided by the selected number of layers is displayed, and options of the other layer widths are not displayed or displayed in gray.

In this manner, steps S2304 and S2308 function as steps for switching the display of a setting value (the display of a layer width and the number of layers) which can be set in accordance with lens information of a lens unit.

In the next step S2309, it is determined whether or not a layer number determination operation has been performed. In the case of No, the processing proceeds to step S2311 to determine whether or not the cursor has been moved in the layer number setting menu. In the case of Yes, it is determined that the number of layers has been changed, and the processing returns to step S2308. In the case of No, the processing returns to step S2309.

In a case where it is determined that the number of layers has been determined, the processing proceeds to step S2310 to determine whether or not setting can be performed with the set number of layers and layer width. This is because the cursor can also be moved to a setting value which is not displayed or displayed in gray. In the case of No, that is, in the case of a combination that cannot be set, the processing returns to step S2302. In the case of Yes, the flow of FIG. 23 is terminated.

Figure 24E:
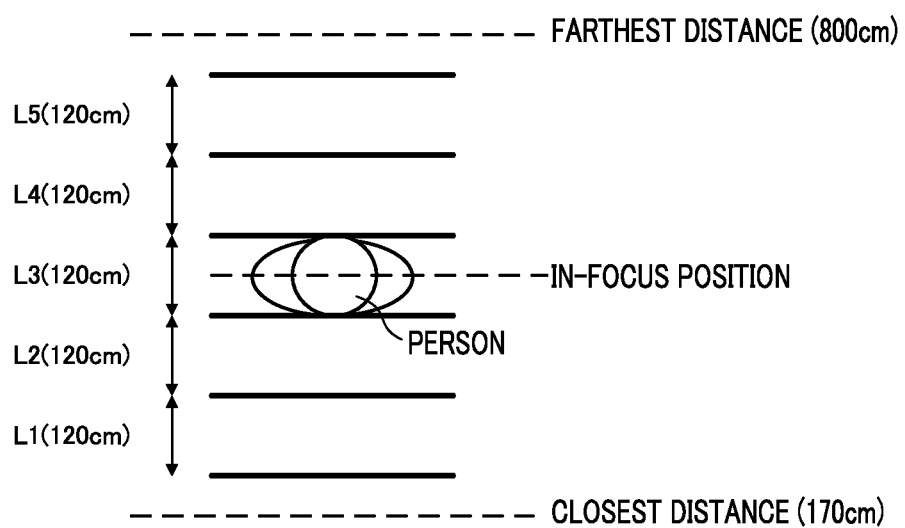

When both the number of layers and a layer width are set once, display corresponding to a change in the number of layers and a layer width is performed each time. For example, when 5-layers is set as illustrated in FIG. 24(C), a distance layer MAP image is displayed as illustrated in FIG. 24(E).

In addition, as described above, detectable distance conditions change depending on the focus position state, zoom state, and aperture state of a lens, and thus in a case where lens conditions have been changed in setting modes for the number of layers and a layer width having been described in the present embodiment, resetting of each of them is started immediately.

Alternatively, in the setting modes for the number of layers and a layer width, lens operations may not be accepted or may be negligible. Note that, in a case where the number of regions into which a synthesized image is to be inserted and the number of pieces of insertion layer information for inserting a synthesized image are two or more, the colors of regions overlapping a subject in a synthesized image to be changed may be made different from each other.

Note that, in a case where lens information has been changed by a predetermined amount or more, it is desirable to generate layer information for each distance. For example, in a case where an imaging unit has moved drastically, in a case where a focal length has changed by a predetermined value or more, in a case where the brightness of a subject has changed and an aperture value has changed, and the like, it is desirable to detect such changes and recalculate the number of layers (layer number) and layer width (width in the distance direction).

Specifically, for example, when an acceleration sensor is provided in an imaging unit and it is detected that an acceleration has become a predetermined value or more, the number of layers (layer number) and a layer width (width in the distance direction) are recalculated.

In addition, also in a case where a lens unit mounted on the imaging unit has been replaced or in a case where the zoom state of the lens unit has been changed, the number of layers (layer number) and a layer width (width in the distance direction) are recalculated. Further, in a case where a subject recognized by an image recognition has moved by a predetermined amount or more and in a case where a background subject which is distant at a predetermined distance or more has moved by a predetermined value or more, it is desirable to adopt a configuration in which the number of layers (layer number) and a layer width (width in the distance direction) are recalculated by detecting the movement of the subject and the change in the subject.

In contrast, when the generation of layer information for each distance is started, an operation for increasing the amount of lens information, such as a focal length, an aperture value, and a focus adjustment operation, to a predetermined amount or more may not be accepted.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to an image processing device or the like through a network or various storage media. Then, a computer (or a CPU, an MPU, or the like) of the image processing device or the like may be configured to read and execute the program. In such a case, the program and the storage medium storing the program configure the present invention.

This application claims the benefit of Japanese Patent Application No. 2022-000224 filed on Jan. 4, 2022, Japanese Patent Application No. 2022-000249 filed on Jan. 4, 2022, and Japanese Patent Application No. 2022-000259 filed on Jan. 4, 2022, Japanese Patent Application No. 2022-183629 filed on Nov. 16, 2022, all of which are hereby incorporated by reference herein in its entirety.

What is claimed is:

1. An image processing device comprising
at least one processor or circuit configured to function as:
an image acquisition unit configured to acquire an image including a subject through a lens unit;
a distance information acquisition unit configured to acquire distance information indicating a distance to the subject;
a layer information generation unit configured to generate layer information on a layer for each distance based on the distance information; and
a setting unit configured to set a reference for generating the layer information and switch display of a setting value capable of being set in accordance with the lens information of the lens unit.

2. The image processing device according to claim 1, wherein the image acquisition unit includes an imaging element in which a plurality of photoelectric conversion units receiving light beams passing through different pupil regions of the lens unit are disposed for each pixel, and is capable of acquiring the distance information based on a phase difference between outputs of the plurality of photoelectric conversion units.

3. The image processing device according to claim 2, wherein the image is acquired by adding the outputs of the plurality of photoelectric conversion units.

4. The image processing device according to claim 1, wherein the layer information generation unit also converts distance information of a distance at which the subject does not exist into the layer information.

5. The image processing device according to claim 1, wherein the lens information includes at least one of a focal length, an in-focus position, and aperture information.

6. The image processing device according to claim 1, wherein the layer information for each distance is generated in a case where the lens information has changed by a predetermined amount or more.

7. The image processing device according to claim 1, wherein the layer information generation unit changes the reference for generating the layer information in accordance with the image.

8. The image processing device according to claim 1, wherein the reference includes the number of layers and a width of the layer in a distance direction.

9. The image processing device according to claim 1, wherein the layer information generation unit generates a histogram based on the distance information and generates the layer information for each distance based on the histogram.

10. The image processing device according to claim 1, wherein the layer information generation unit recognizes the subject by an image recognition unit to generate the layer information for each distance in accordance with the recognized subject.

11. The image processing device according to claim 10, wherein the layer information generation unit changes a width of the layer in a distance direction for each distance in accordance with a type of the recognized subject.

12. The image processing device according to claim 10, wherein the layer information generation unit is capable of selecting the type of subject capable of being recognized.

13. The image processing device according to claim 1, wherein the layer information generation unit generates the layer information based on the image of a plurality of frames.

14. The image processing device according to claim 1, wherein the layer information generation unit generates the layer information for each distance based on the lens information of the lens unit and the distance information.

15. The image processing device according to claim 1, wherein the layer information generation unit calculates a minimum resolution in the layer information for each distance based on the lens information of the lens unit.

16. The image processing device according to claim 1, wherein the setting unit is capable of setting a synthesized image insertion region for inserting a synthesized image and insertion layer information, which is layer information for inserting the synthesized image, for the image.

17. The image processing device according to claim 1, wherein the layer information generation unit generates the layer information based on the distance information in a case where an acceleration of the image acquisition unit becomes a predetermined value or more.

18. The image processing according to claim 1, wherein the layer information generation unit generates the layer information based on the distance information when a subject at a predetermined distance or more in the image has moved by a predetermined value or more.

19. An image processing method comprising:
acquiring an image including a subject through a lens unit;
acquiring distance information indicating a distance to the subject;
generating layer information on a layer for each distance based on the distance information; and
setting a reference for generating the layer information and switching display of a setting value capable of being set in accordance with the lens information of the lens unit.

20. A non-transitory computer-readable storage medium configured to store a computer program comprising instructions for executing following processes:
acquiring an image including a subject through a lens unit;
acquiring distance information indicating a distance to the subject;
generating layer information on a layer for each distance based on the distance information; and
setting a reference for generating the layer information and switching display of a setting value capable of being set in accordance with the lens information of the lens unit.

* * * * *